(12) United States Patent
Kumar et al.

(10) Patent No.: US 10,339,548 B1
(45) Date of Patent: Jul. 2, 2019

(54) DETERMINING PRICING INFORMATION FROM MERCHANT DATA

(71) Applicant: Square, Inc., San Francisco, CA (US)

(72) Inventors: Abhay Kumar, San Francisco, CA (US); Rong Yan, Palo Alto, CA (US); Mason Ng, Palo Alto, CA (US); Gian Perrone, San Francisco, CA (US); Mai Leduc, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 730 days.

(21) Appl. No.: 14/289,467

(22) Filed: May 28, 2014

Related U.S. Application Data

(60) Provisional application No. 61/969,720, filed on Mar. 24, 2014.

(51) Int. Cl.
G06Q 30/02 (2012.01)
G06Q 20/20 (2012.01)

(52) U.S. Cl.
CPC ......... *G06Q 30/0206* (2013.01); *G06Q 20/20* (2013.01)

(58) Field of Classification Search
CPC .................................................... G06Q 30/02
See application file for complete search history.

(56) References Cited

U.S. PATENT DOCUMENTS

| | | | |
|---|---|---|---|
| 5,057,829 A | 10/1991 | Velazquez | |
| 5,933,813 A | 8/1999 | Teicher et al. | |
| 6,128,415 A | 10/2000 | Hultgreen, III et al. | |
| 6,151,582 A | 11/2000 | Huang et al. | |
| 6,431,444 B1 | 8/2002 | Gatto | |
| 6,505,168 B1 | 1/2003 | Rothman et al. | |
| 6,609,101 B1 | 8/2003 | Landvater | |
| 6,694,300 B1 | 2/2004 | Walker et al. | |

(Continued)

FOREIGN PATENT DOCUMENTS

CA   2 332 083 A1   7/2001

OTHER PUBLICATIONS

Non-Final Office Action dated Nov. 20, 2015, for U.S. Appl. No. 14/284,926 of Perrone, G., et al., filed May 22, 2014.

(Continued)

*Primary Examiner* — Kurtis Gills
(74) *Attorney, Agent, or Firm* — Lee & Hayes, P.C.

(57) ABSTRACT

A service provider may receive item price information and/or point of sale (POS) transaction information from a plurality of merchant devices associated with a plurality of merchants. The service provider may categorize the plurality of merchants according to the types of items offered by the respective merchants, and may further categorize the merchants according to the locations at which they conduct business. The service provider may subsequently determine a price recommendation or other pricing information for a particular item offered by a particular merchant. A merchant device of the particular merchant may present the pricing information in a user interface that enables the merchant to view projected sales at various different price points. Further, the merchant may be able to specify one or more factors used for determining the recommend price, such as a desired business model, a desired clientele, a desired profit margin, or the like.

28 Claims, 13 Drawing Sheets

(56) References Cited

U.S. PATENT DOCUMENTS

| | | | |
|---|---|---|---|
| 7,092,929 B1 | 8/2006 | Dvorak et al. | |
| 7,222,786 B2 | 5/2007 | Renz et al. | |
| 7,343,319 B1 | 3/2008 | Walker et al. | |
| 7,379,916 B1 | 5/2008 | Mizrah | |
| 7,552,066 B1 | 6/2009 | Landvater | |
| 7,660,738 B1 * | 2/2010 | Siegel | G06Q 20/12 705/20 |
| 7,792,256 B1 | 9/2010 | Arledge et al. | |
| 7,818,284 B1 | 10/2010 | Walker et al. | |
| 7,979,299 B1 * | 7/2011 | Mehta | G06Q 30/0201 705/400 |
| 8,001,017 B1 | 8/2011 | Franco | |
| 8,103,538 B2 | 1/2012 | Bamberg et al. | |
| 8,175,908 B1 | 5/2012 | Anderson | |
| 8,204,799 B1 | 6/2012 | Murray et al. | |
| 8,417,572 B1 | 4/2013 | Chenault | |
| 8,438,066 B1 * | 5/2013 | Yuen | G06Q 20/206 705/16 |
| 8,533,053 B2 | 9/2013 | Brown et al. | |
| 8,732,040 B1 | 5/2014 | Prabhune et al. | |
| 8,868,522 B1 | 10/2014 | Zennaro et al. | |
| 9,168,315 B1 | 10/2015 | Scaringe et al. | |
| 9,619,483 B1 | 4/2017 | Robinson et al. | |
| 9,619,831 B1 | 4/2017 | Kumar et al. | |
| 9,697,531 B1 | 7/2017 | Bourget | |
| 9,767,471 B1 | 9/2017 | Perrone et al. | |
| 9,786,005 B1 | 10/2017 | Poursartip et al. | |
| 9,792,597 B1 | 10/2017 | Jen et al. | |
| 2001/0013011 A1 | 8/2001 | Day et al. | |
| 2001/0014868 A1 | 8/2001 | Herz et al. | |
| 2001/0034722 A1 | 10/2001 | Tidball et al. | |
| 2001/0042008 A1 | 11/2001 | Hull et al. | |
| 2001/0047308 A1 | 11/2001 | Kaminsky et al. | |
| 2002/0010661 A1 | 1/2002 | Waddington et al. | |
| 2002/0065839 A1 | 5/2002 | McCulloch | |
| 2002/0072988 A1 | 6/2002 | Aram | |
| 2002/0087384 A1 | 7/2002 | Neifeld | |
| 2002/0143655 A1 | 10/2002 | Elston et al. | |
| 2002/0188579 A1 | 12/2002 | Liu et al. | |
| 2003/0006098 A1 | 1/2003 | Wike, Jr. et al. | |
| 2003/0018701 A1 | 1/2003 | Kaestle et al. | |
| 2003/0026404 A1 | 2/2003 | Joyce et al. | |
| 2003/0033179 A1 | 2/2003 | Katz et al. | |
| 2003/0046133 A1 | 3/2003 | Morley et al. | |
| 2003/0132298 A1 | 7/2003 | Swartz et al. | |
| 2003/0151821 A1 | 8/2003 | Favalora et al. | |
| 2003/0191709 A1 | 10/2003 | Elston et al. | |
| 2004/0019552 A1 | 1/2004 | Tobin | |
| 2004/0039639 A1 | 2/2004 | Walker et al. | |
| 2004/0098311 A1 | 5/2004 | Nair et al. | |
| 2004/0181753 A1 | 9/2004 | Michaelides | |
| 2004/0198389 A1 | 10/2004 | Alcock et al. | |
| 2005/0060245 A1 | 3/2005 | Hoffman et al. | |
| 2005/0139662 A1 | 6/2005 | Eglen et al. | |
| 2005/0149414 A1 | 7/2005 | Schrodt et al. | |
| 2005/0250555 A1 | 11/2005 | Richardson et al. | |
| 2005/0273377 A1 | 12/2005 | Ouimet et al. | |
| 2006/0031085 A1 | 2/2006 | Postel et al. | |
| 2006/0064392 A1 | 3/2006 | Glisson | |
| 2006/0106699 A1 | 5/2006 | Hitalenko et al. | |
| 2006/0195563 A1 | 8/2006 | Chapin et al. | |
| 2006/0223508 A1 | 10/2006 | Starr et al. | |
| 2006/0224470 A1 | 10/2006 | Garcia Ruano et al. | |
| 2006/0235726 A1 | 10/2006 | Paraison et al. | |
| 2006/0235739 A1 | 10/2006 | Levis et al. | |
| 2006/0237531 A1 | 10/2006 | Heffez et al. | |
| 2006/0253330 A1 | 11/2006 | Maggio et al. | |
| 2007/0130090 A1 | 6/2007 | Staib et al. | |
| 2007/0179836 A1 | 8/2007 | Juang et al. | |
| 2007/0250440 A1 | 10/2007 | Paulsen et al. | |
| 2007/0250441 A1 | 10/2007 | Paulsen et al. | |
| 2007/0270165 A1 | 11/2007 | Poosala | |
| 2008/0033805 A1 | 2/2008 | Padin | |
| 2008/0046334 A1 | 2/2008 | Lee et al. | |
| 2008/0077459 A1 * | 3/2008 | Desai | G06Q 10/06314 705/7.24 |
| 2008/0103846 A1 | 5/2008 | Armstrong et al. | |
| 2008/0147507 A1 | 6/2008 | Langhammer | |
| 2008/0191881 A1 | 8/2008 | Minerley | |
| 2008/0198761 A1 | 8/2008 | Murawski et al. | |
| 2008/0201232 A1 | 8/2008 | Walker et al. | |
| 2008/0216001 A1 | 9/2008 | Ording et al. | |
| 2008/0228582 A1 | 9/2008 | Fordyce et al. | |
| 2008/0249837 A1 | 10/2008 | Angell et al. | |
| 2008/0262935 A1 | 10/2008 | Baumgartner et al. | |
| 2008/0275771 A1 | 11/2008 | Levine | |
| 2008/0301095 A1 | 12/2008 | Zhu et al. | |
| 2009/0048884 A1 | 2/2009 | Olives et al. | |
| 2009/0076896 A1 | 3/2009 | DeWitt et al. | |
| 2009/0076925 A1 | 3/2009 | DeWitt et al. | |
| 2009/0089148 A1 | 4/2009 | Gujjar et al. | |
| 2009/0094237 A1 | 4/2009 | Churi et al. | |
| 2009/0319359 A1 | 12/2009 | Soza et al. | |
| 2010/0076813 A1 | 3/2010 | Ghosh et al. | |
| 2010/0138037 A1 | 6/2010 | Adelberg et al. | |
| 2010/0174596 A1 | 7/2010 | Gilman et al. | |
| 2010/0234986 A1 | 9/2010 | Clopton et al. | |
| 2010/0274680 A1 | 10/2010 | Carlson et al. | |
| 2010/0306032 A1 | 12/2010 | Jolley | |
| 2011/0004506 A1 | 1/2011 | May et al. | |
| 2011/0010448 A1 | 1/2011 | Gill et al. | |
| 2011/0011931 A1 | 1/2011 | Farley et al. | |
| 2011/0035288 A1 | 2/2011 | Clyne | |
| 2011/0047022 A1 | 2/2011 | Walker et al. | |
| 2011/0054649 A1 | 3/2011 | Sarkis et al. | |
| 2011/0066504 A1 | 3/2011 | Chatow et al. | |
| 2011/0087547 A1 | 4/2011 | Amaro et al. | |
| 2011/0093326 A1 | 4/2011 | Bous et al. | |
| 2011/0112897 A1 | 5/2011 | Tietzen et al. | |
| 2011/0119122 A1 | 5/2011 | Padam et al. | |
| 2011/0213644 A1 * | 9/2011 | Phene | G06Q 10/04 705/14.1 |
| 2011/0225023 A1 | 9/2011 | Evens et al. | |
| 2011/0238517 A1 | 9/2011 | Ramalingam et al. | |
| 2011/0238577 A1 | 9/2011 | Shuster | |
| 2011/0246272 A1 | 10/2011 | Joa et al. | |
| 2011/0258117 A1 | 10/2011 | Ahmad et al. | |
| 2011/0264581 A1 | 10/2011 | Clyne | |
| 2011/0302011 A1 | 12/2011 | Yoder et al. | |
| 2011/0302013 A1 | 12/2011 | Dance et al. | |
| 2011/0313840 A1 * | 12/2011 | Mason | G06Q 30/02 705/14.35 |
| 2011/0313874 A1 | 12/2011 | Hardie et al. | |
| 2012/0005019 A1 | 1/2012 | LeBlanc et al. | |
| 2012/0016758 A1 | 1/2012 | Bouaziz et al. | |
| 2012/0054076 A1 | 3/2012 | Wu et al. | |
| 2012/0084119 A1 | 4/2012 | Vandehey et al. | |
| 2012/0094639 A1 | 4/2012 | Carlson et al. | |
| 2012/0095882 A1 | 4/2012 | Wolff | |
| 2012/0116810 A1 | 5/2012 | Knowlton et al. | |
| 2012/0130724 A1 | 5/2012 | Flegel et al. | |
| 2012/0143700 A1 | 6/2012 | Bhattacharya et al. | |
| 2012/0209661 A1 * | 8/2012 | Bennett | G06Q 30/0207 705/7.31 |
| 2012/0239524 A1 | 9/2012 | Ouimet et al. | |
| 2012/0271827 A1 | 10/2012 | Merz | |
| 2012/0290349 A1 | 11/2012 | Burkhart et al. | |
| 2012/0311723 A1 | 12/2012 | Britt, Jr. et al. | |
| 2012/0323681 A1 | 12/2012 | Bercaw | |
| 2013/0006742 A1 | 1/2013 | Richard | |
| 2013/0031006 A1 | 1/2013 | McCullagh et al. | |
| 2013/0046634 A1 * | 2/2013 | Grigg | G06Q 30/00 705/14.58 |
| 2013/0046717 A1 | 2/2013 | Grigg et al. | |
| 2013/0066698 A1 | 3/2013 | Levy et al. | |
| 2013/0066733 A1 | 3/2013 | Levy et al. | |
| 2013/0066740 A1 | 3/2013 | Ouimet et al. | |
| 2013/0124360 A1 * | 5/2013 | Mitrovic | G06Q 30/0611 705/26.4 |
| 2013/0126610 A1 | 5/2013 | Aihara et al. | |
| 2013/0132140 A1 | 5/2013 | Amin et al. | |
| 2013/0132180 A1 | 5/2013 | Aihara et al. | |
| 2013/0132193 A1 | 5/2013 | Aihara et al. | |

(56) References Cited

U.S. PATENT DOCUMENTS

| | | | |
|---|---|---|---|
| 2013/0132218 A1 | 5/2013 | Aihara et al. | |
| 2013/0132246 A1 | 5/2013 | Amin et al. | |
| 2013/0132887 A1 | 5/2013 | Amin et al. | |
| 2013/0173435 A1 | 7/2013 | Cozad, Jr. | |
| 2013/0204791 A1 | 8/2013 | Dorsey et al. | |
| 2013/0246176 A1* | 9/2013 | Chang | G06Q 30/0204 705/14.53 |
| 2013/0246207 A1 | 9/2013 | Novak et al. | |
| 2013/0246301 A1 | 9/2013 | Radhakrishnan et al. | |
| 2013/0276020 A1 | 10/2013 | Khan | |
| 2013/0282392 A1 | 10/2013 | Wurm | |
| 2013/0311211 A1 | 11/2013 | Zafar et al. | |
| 2014/0025524 A1 | 1/2014 | Sims et al. | |
| 2014/0046748 A1 | 2/2014 | Nagarajan et al. | |
| 2014/0067596 A1* | 3/2014 | McGovern | G06Q 30/02 705/26.7 |
| 2014/0067677 A1 | 3/2014 | Ali et al. | |
| 2014/0089133 A1 | 3/2014 | Argue et al. | |
| 2014/0114777 A1 | 4/2014 | Guyot | |
| 2014/0122137 A1 | 5/2014 | Nelson et al. | |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0149201 A1 | 5/2014 | Abbott et al. | |
| 2014/0156449 A1 | 6/2014 | Ganesan et al. | |
| 2014/0164083 A1 | 6/2014 | Wilkes | |
| 2014/0180767 A1 | 6/2014 | Villars | |
| 2014/0180959 A1 | 6/2014 | Gillen et al. | |
| 2014/0214562 A1 | 7/2014 | Cancro et al. | |
| 2014/0214572 A1 | 7/2014 | Cancro et al. | |
| 2014/0240725 A1 | 8/2014 | Banfield et al. | |
| 2014/0249941 A1 | 9/2014 | Hicks et al. | |
| 2014/0278804 A1 | 9/2014 | Lanxner et al. | |
| 2014/0279241 A1 | 9/2014 | Bartholomew et al. | |
| 2014/0330685 A1 | 11/2014 | Nazzari | |
| 2014/0344093 A1 | 11/2014 | Du et al. | |
| 2014/0344118 A1 | 11/2014 | Parpia et al. | |
| 2014/0365301 A1 | 12/2014 | Rappoport et al. | |
| 2015/0051994 A1 | 2/2015 | Ward et al. | |
| 2015/0058088 A1 | 2/2015 | Unser et al. | |
| 2015/0066671 A1 | 3/2015 | Nichols et al. | |
| 2015/0095091 A1 | 4/2015 | Kamdar | |
| 2015/0095228 A1 | 4/2015 | Su et al. | |
| 2015/0100433 A1 | 4/2015 | Choy et al. | |
| 2015/0134552 A1 | 5/2015 | Engels et al. | |
| 2015/0206087 A1 | 7/2015 | Tavares | |
| 2015/0220945 A1 | 8/2015 | Iannace et al. | |
| 2015/0269642 A1 | 9/2015 | Cai et al. | |
| 2015/0278845 A1 | 10/2015 | Sorem et al. | |
| 2015/0302510 A1 | 10/2015 | Godsey et al. | |
| 2015/0310397 A1 | 10/2015 | Xu | |
| 2016/0092827 A1 | 3/2016 | Colodny et al. | |
| 2016/0321677 A1 | 11/2016 | Dobaj | |
| 2017/0011423 A1 | 1/2017 | Douglas et al. | |
| 2017/0032382 A1 | 2/2017 | Shulman et al. | |
| 2017/0228808 A1 | 8/2017 | Kumar et al. | |
| 2017/0236152 A1 | 8/2017 | Dimaunahan et al. | |
| 2017/0345105 A1 | 11/2017 | Isaacson et al. | |
| 2018/0025442 A1 | 1/2018 | Isaacson et al. | |
| 2018/0150387 A1 | 5/2018 | Kogan et al. | |
| 2018/0232817 A1 | 8/2018 | Isaacson et al. | |

OTHER PUBLICATIONS

"Uber-Android Apps on Google Play," dated Nov. 10, 2014, Retrieved from the Internet URL: https://play.google.com/store/apps/details?id=com.ubercab&hl=en, on Nov. 12, 2014, pp. 1-2.

Non-Final Office Action dated Sep. 10, 2015, for U.S. Appl. No. 14/032,585 of Bourget, E.W., filed Sep. 20, 2013.

Final Office Action dated Mar. 23, 2016, for U.S. Appl. No. 14/032,585 of Bourget, E.W., filed Sep. 30, 2016.

Final Office Action dated Jun. 21, 2016, for U.S. Appl. No. 14/284,926 of Perrone, G., et al., filed May 22, 2014.

Non-Final Office Action dated Jul. 28, 2016, for U.S. Appl. No. 14/289,469 of Kumar, A., et al., filed May 28, 2014.

Non-Final Office Action dated Jul. 29, 2016, for U.S. Appl. No. 14/032,585 of Bourget, E.W., filed Sep. 20, 2013.

Non-Final Office Action dated Jul. 29, 2016, for U.S. Appl. No. 14/284,980 of Perrone, G., et al., filed May 22, 2014.

Advisory Action dated Sep. 26, 2016, for U.S. Appl. No. 14/284,926 of Perrone, G., et al., filed May 22, 2014.

Final Office Action dated Nov. 25, 2016, for U.S Appl. No. 14/284,856, of Perrone, G., et al., filed May 22, 2014.

Non-Final Office Action dated Dec. 19, 2016, for U.S. Appl. No. 14/289,443, of Kumar, A., et al., filed May 28, 2014.

Final Office Action dated Dec. 21, 2016, for U.S. Appl. No. 14/284,980, of Perrone, G., et al., filed May 22, 2014.

Notice of Allowance dated Dec. 23, 2016, for U.S. Appl. No. 14/289,469, of Kumar, A., et al., filed May 28, 2014.

Notice of Allowance dated Jan. 27, 2017, for U.S. Appl. No. 14/032,585, of Bourget, E.W., filed Sep. 20, 2013.

Advisory Action dated Feb. 22, 2017, for U.S. Appl. No. 14/284,980, of Perrone, G., et al., filed May 22, 2014.

Advisory Action dated Feb. 24, 2017, for U.S. Appl. No. 14/284,856, of Perrone, G., et al., filed May 22, 2014.

Notice of Allowance dated Mar. 6, 2017, for U.S. Appl. No. 14/032,585, of Bourget, E.W., filed Sep. 20, 2013.

Non-Final Office Action dated Sep. 12, 2014, for U.S Appl. No. 14/284,856 of Perrone, G., et al., filed May 22, 2014.

Final Office Action dated Jan. 16, 2015, for U.S. Appl. No. 14/284,856 of Perrone, G., et al., filed May 22, 2014.

Non-Final Office Action dated Oct. 5, 2015, for U.S. Appl. No. 14/284,856 of Perrone, G., et al., filed May 22, 2014.

Non-Final Office Action dated May 22, 2017, for U.S. Appl. No. 14/284,926, of Perrone, G., et al., filed May 22, 2014.

Notice of Allowance dated May 22, 2017, for U.S. Appl. No. 14/284,980, of Perrone, G., et al., filed May 22, 2014.

Non-Final Office Action dated Dec. 21, 2017, for U.S. Appl. No. 14/284,856, of Perrone, G., et al., filed May 22, 2014.

Final Office Action dated Sep. 20, 2017, for U.S. Appl. No. 14/284,926, of Perrone, G., et al., filed May 22, 2014.

Final Rejection dated Dec. 6, 2017, for U.S. Appl. No. 14/289,443, of Kumar, A., et al., filed May 28, 2014.

Chen, F., and Samroengraja, R., "A Staggered Ordering Policy for One-Warehouse, Multiretailer Systems," Operations Research, vol. 48, Issue 2, pp. 281-293 (Apr. 1, 2000).

Cox, J.F., III, and Walker, E.D., II, "The Poker Chip Game: A Multi-product, Multi-customer, Multi-echelon, Stochastic Supply Chain Network Useful for Teaching the Impacts of Pull versus Push Inventory Policies on Link and Chain Performance," INFORMS Transactions on Education, vol. 6, Issue 3, pp. 3-19 (May 1, 2006).

Ross, D.F., "Replenishment Inventory Planning," Chapter 7 of Distribution Planning and Control: Managing in the Era of Supply Chain Management, Chapman & Hall, pp. 263-319 (1996).

Wah, B.W., "Wiley Encyclopedia of Computer Science and Engineering," Wiley-Interscience, vol. 1, pp. 1-2365 (Nov. 2008).

Non-Final Office Action dated Jul. 6, 2018, for U.S. Appl. No. 14/800,021, of Tsou, V., filed Jul. 15, 2015.

Final Office Action dated Jul. 26, 2018, for U.S. Appl. No. 14/800,090, of Tsou, V., filed Jul. 15, 2015.

Non-Final Office Action dated Aug. 6, 2018, for U.S. Appl. No. 14/964,231, of Jen, M., et al., filed Dec. 9, 2015.

Final Office Action dated Aug. 15, 2018, for U.S. Appl. No. 14/700,013, of Brock, Z., et al., filed Apr. 29, 2015.

Non-Final Office Action dated Aug. 28, 2018, for U.S. Appl. No. 14/522,208, of Cieri, M.M., et al., filed Oct. 23, 2014.

Non-Final Office Action dated Sep. 6, 2018, for U.S. Appl. No. 15/858,911, of Funk, M., et al., filed Dec. 29, 2017.

Non-Final Office Action dated Sep. 14, 2018, for U.S. Appl. No. 14/964,263, of Jen, M., et al., filed Dec. 9, 2015.

Final Office Action dated Sep. 24, 2018, for U.S. Appl. No. 14/700,044, of Brock, Z., et al., filed Apr. 29, 2015.

Non-Final Office Action dated Apr. 24, 2017, for U.S. Appl. No. 14/700,044, of Brock, Z., et al., filed Apr. 29, 2015.

Non-Final Office Action dated Jun. 30, 2017, for U.S. Appl. No. 14/522,208, of Cieri, M., et al., filed Oct. 23, 2014.

(56) References Cited

OTHER PUBLICATIONS

Final Office Action dated Sep. 6, 2017, for U.S. Appl. No. 14/700,044, of Brock, Z., et al., filed Apr. 29, 2015.
Advisory Action dated Nov. 9, 2017, for U.S. Appl. No. 14/700,044, of Brock, Z., et al., filed Apr. 29, 2015.
Final Office Action dated Nov. 24, 2017, for U.S. Appl. No. 14/522,208, of Cieri, M.M., et al., filed Oct. 23, 2014.
Non-Final Office Action dated Jan. 26, 2018, for U.S. Appl. No. 14/800,090, of Tsou, V., filed Jul. 15, 2015.
Non-Final Office Action dated Feb. 5, 2018, for U.S. Appl. No. 14/700,013, of Brock, Z., et al., filed Apr. 29, 2015.
Non-Final Office Action dated Apr. 10, 2018, for U.S. Appl. No. 14/700,044, of Brock, Z., et al., filed Apr. 29, 2015.

* cited by examiner

US 10,339,548 B1

DETERMINING PRICING INFORMATION FROM MERCHANT DATA

RELATED APPLICATIONS

This application claims the benefit of U.S. Provisional Patent Application No. 61/969,720, filed Mar. 24, 2014, which is incorporated herein by reference in its entirety.

BACKGROUND

People conduct transactions with many different merchants for acquiring many different types of goods and services. Merchants, who are purveyors of these goods and services, often perform transactions in person with their customers at a point of sale location. However, it can be difficult for such merchants to obtain information that could assist the merchants in growing and improving their businesses. For example, merchants often have little access to information that can assist them in determining prices to charge for their goods or services.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
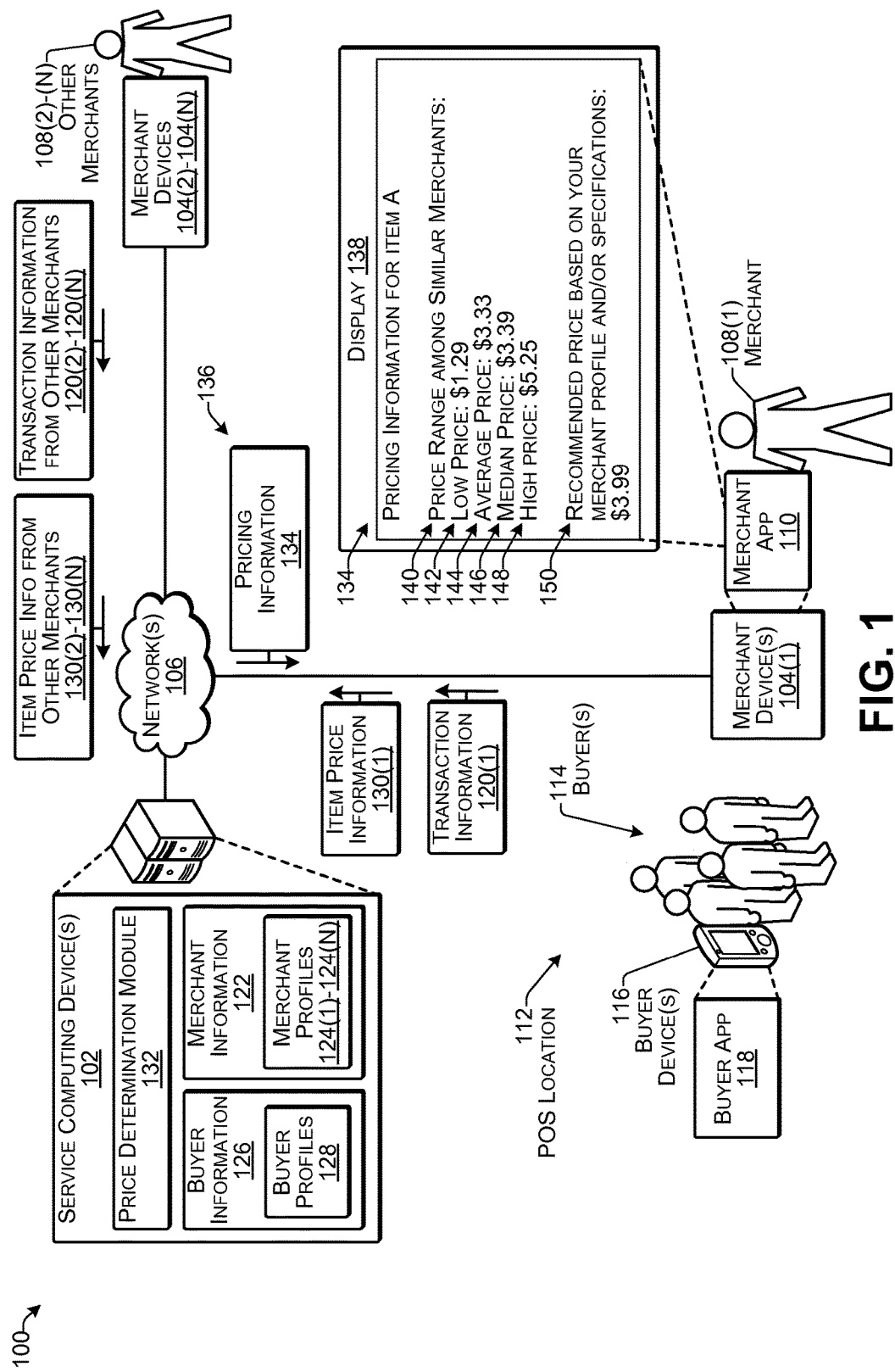
FIG. 1 illustrates an example environment for a payment and pricing information service according to some implementations.

Some implementations described herein include techniques and arrangements for providing pricing information to a merchant based, at least in part, on item price information and/or transaction information received from a plurality of merchant devices associated with a plurality of other merchants. For example, a service provider may provide a payment service to the plurality of merchants to enable transactions between the merchants and buyers at point of sale (POS) locations. As used herein, a transaction may include a financial transaction for the acquisition of goods and/or services (referred to herein as items) that is conducted between a buyer (e.g., a customer) and a merchant, such as at a POS location. Thus, the service provider may receive transaction information for a large number of POS transactions between buyers and merchants at a plurality of POS locations for a variety of items. Further, in some examples, the service provider may receive item price information directly from a plurality of merchants. The service provider may analyze the received transaction information and/or the received item price information for determining personalized pricing information for a particular merchant, such as for assisting the merchant in determining pricing for one or more items offered by the particular merchant.

In some examples, the service provider may send personalized pricing information to a merchant device associated with a particular merchant. For instance, the pricing information may recommend a price or a range of prices for an item offered by the merchant, or for an item that the merchant is considering offering. In some cases, the pricing information may be determined based at least in part on transaction information from the plurality of transactions and/or based at least in part on the item price information received from the plurality of merchants. For example, the pricing information provided to the merchant may indicate to the merchant the prices that other merchants in the same geographic region are charging for a particular item. Thus, the pricing information may provide a range of prices, such as from low price to high price, the median price, the average price, or the like. The pricing information provided by the service provider may further include a recommended price for the particular merchant that is based on information about the particular merchant. For example, the particular merchant may have expressed a desire to sell to a particular type of customer, may have specified a profit margin desired for each item sold, may have specified a certain number of units to be sold over a certain period of time, and so forth.

As another example, the service provider may determine price sensitivity of the buyers that frequent a particular merchant. For example, the service provider may determine that, for a particular merchant, if the merchant were to increase the price of a particular item by, e.g., 10%, the number of sales of the item by the merchant may not be significantly affected as the buyers that frequent the particular merchant would likely not object to paying the additional amount for the item. In some instances, this information may be determined from the buyer profiles of the buyers that have conducted a plurality of transactions at the particular merchant in the past. For instance, the buyer profiles may indicate that the buyers have tended to continue to purchase similar items despite price increases in the past, either at the particular merchant, or at other similar merchants in the geographic region, and/or regularly purchase the same item for a higher price at other merchants.

As one example, suppose that the particular merchant operates a deli that sells 32-oz fountain drinks for $1.99. Furthermore, suppose that the buyer profiles indicate that the buyers who frequent the particular merchant also frequent other delis in the same geographic area and commonly pay $2.59-$2.99 for a 32-oz fountain drink at the other delis. Accordingly, the service provider may inform the particular merchant that the buyers who frequent the particular merchant would likely not be price-sensitive if the merchant increased the price currently charged for 32-oz fountain drinks.

In some instances, a merchant can interact with a POS computing device, or other merchant device, to sign up for the payment service and the pricing information service. In addition, to a certain extent, a merchant may be able to specify a type of customer the merchant would like to cater to, or a type of business model under which the merchant would like to operate. For example, at one end the scale, the merchant may wish to cater to a smaller number of high-end customers and charge higher prices for more personalized service or, at the other end of the scale, the merchant may wish to cater to a larger volume of customers for lower prices, and not spend as much time serving each customer. For instance, some merchants may desire to serve a smaller number of customers to provide a higher quality of service to each customer, while charging an associated higher price per customer, e.g., so that the merchant has time to work with each customer individually. On the other hand, other merchants may desire to rely on a high volume of sales with a lower profit margin per sale, and may not care to devote a large amount of time to each customer. Accordingly, the pricing information may provide each merchant with particular ranges for pricing of items to attain either of these business models, or various business models between these two business models. Thus, implementations herein may assist a merchant in managing, at least in part, the type of business that the merchant will operate.

Furthermore, in some examples, the service provider may determine that the customer base of a particular merchant has changed over time and, in response, may recommend that the particular merchant adjust the prices charged for one or more items based on the change in the customer base of the particular merchant. In other words, in order to maintain the customer base that the merchant currently has, the service provider may recommend that the merchant adjust the pricing of particular items either up or down, depending on how the customer base of the merchant has changed. As another example, as new customers become regular customers, the service provider may detect this based on the frequency with which particular buyers visit the particular merchant. In response, the service provider may recommend that the merchant begin adjusting prices of particular items upward based on the changes in the customer base, the regularity with which the particular items are purchased, and so forth.

Further, in some examples, the merchant may inform the service provider that the merchant desires to have a relatively fixed profit margin. Thus, the service provider may recommend that the merchant adjust the pricing of one or more items up or down to maintain the fixed margin for the particular items. As another example, the merchant may provide financial data to the service provider, such as overhead costs, inventory costs, cost per item, desired margin, and so forth, to enable the service provider to take the financial data into consideration when determining pricing for the particular merchant, such as for maintaining overall profitability, particular profit margins, and so forth.

In some examples, the pricing information may be provided to a particular merchant when the particular merchant is first starting a business, such as to enable the merchant to determine pricing for the items that the merchant will offer, and to enable the merchant to price the items appropriately for the customer base desired by the merchant. As another example, as the price that the merchant pays for inventory or raw materials changes, the service provider may recommend that the price that the merchant charges for certain items be changed accordingly.

A merchant application on the merchant device may provide a user interface to enable the merchant to select or otherwise specify a price for a particular item. For example, the user interface may provide a graphic element that indicates a lower price range and an upper price range and may indicate a recommended price or recommended price range for the particular item based on a number of factors. Such factors may include how the merchant is currently pricing other items offered by the merchant, how other merchants in the same geographic region price the particular item, how much buyers who frequent the merchant and similar merchants usually pay for the item, and so forth. As one example, if the merchant currently prices most of his or her other items in a premium price range, then the recommended price for the particular merchant for a new item may be in a premium price range as well, as the merchant's pricing policy implies a business model of building a premium brand with premium pricing. In some cases, the user interface may enable the merchant to interact with the pricing information, such as by providing a sliding scale, a virtual dial, or other virtual control, to enable the merchant to view predictions as to the effect of different prices on the expected number of units that will be sold by the merchant at a selected price along the scale. Further, the pricing for different types of items offered by the merchant may be compared to determine if the merchant's pricing is consistent across the different types of items for the type of business model under which that the merchant is operating.

As mentioned above, in some cases, transaction information from the merchant and/or from other merchants may be used to determine pricing information. For instance, when paying for a transaction, a buyer can provide the payment that is due to a merchant using any of cash, a check, a payment card, or an electronic payment account, such as may be accessed using a buyer device carried by the buyer. The merchant can interact with the merchant device to process the transaction. During or after the transaction, the merchant device can send, to the service provider, transaction information describing the transaction, such as a description of the item(s) selected by the buyer, price(s) of the item(s) selected, a time, place and date of the transaction, and so forth. In addition, the merchant device can often provide buyer identifying information with the transaction information sent to the service provider. For instance, buyer identifying information may be determined from a payment card of the current buyer, from an electronic payment account of the current buyer, from a merchant club membership for which the current buyer has signed up, or the like.

Additionally or alternatively, the service provider may refer to transaction histories of merchants that have been determined to be similar to the particular merchant, such as based on types of items sold and/or geographic location. Based at least in part on the transaction histories for similar merchants, the service provider may send to the merchant device of the particular merchant pricing information for a particular item, such as a recommendation that the merchant offer the particular item at a particular price. Additionally, in some cases, other transaction information in the transaction histories may also be taken into consideration, such as date and time of day of the transactions, overall amount spent, locations of the transactions, and so forth.

Suppose the transaction history for the particular merchant and the transaction histories for similar merchants show that buyers often purchase a large flavored latte for a price between $2.25 and $5.49 from merchants similar to the current merchant, with the median price being $3.75. Consequently, the service provider may determine a recommended price for the particular merchant to charge for the large flavored latte, e.g., from the merchant's pricing of other items, from the merchant's expressed or implied preferences for pricing, from the merchant's expressed or implied preferences for categories of customers, from the merchant's own past sales of this item or other items, from pricing and sales histories of similar merchants, and/or from various other considerations, as discussed additionally below. Based on this determination, the service provider may send pricing information to the merchant device to recommend that the merchant offer the large flavored latte at a price of, e.g., $4.99. Thus, the merchant device may receive, from the service provider, the pricing information including the recommended price for the particular merchant.

The merchant device may present the received pricing information on a display associated with the merchant device to enable the particular merchant to select a price for the corresponding item. For instance, the pricing information may be presented on the merchant device by a merchant application. Further, the merchant may be able to interact with the presented pricing information to select additional or alternative prices for the item, and the merchant application may present, e.g., alternative sales projections at the alternative prices. In some cases, the merchant application may provide a user interface including a virtual control to enable the merchant to select different possible prices. When the merchant has decided on a price, the merchant may use the user interface to set the selected price. The selected price may be automatically applied to a payment service module of the merchant application, and/or may be propagated to additional merchant devices associated with the merchant.

Furthermore, the pricing information may be periodically updated by the service provider based on newly received transaction information and/or newly received merchant item price information. For example, the service provider may continually receive item price information and transaction information from a plurality of merchants, including the particular merchant, and may organize this information into merchant profiles and/or buyer profiles. For example, a single buyer profile may include transaction information for a plurality transactions conducted by the corresponding buyer with various different merchants. The transaction information from a plurality of buyer profiles can be aggregated and analyzed to determine characteristics of buyers that are customers or potential customers of a particular merchant, and to determine the prices paid for particular items by particular buyers or categories of buyers. Furthermore, the item price information of a plurality of merchants and the transaction histories of the plurality of merchants may be organized into respective merchant profiles corresponding to respective merchants. The service provider may provide pricing recommendations that are targeted or otherwise personalized for a particular merchant based on an analysis of the transaction information in the buyer profiles and/or the merchant profiles.

For discussion purposes, some example implementations are described in the environment of a service computing device that makes pricing recommendations to a merchant based on analysis of transaction information and/or merchant item price information. However, implementations herein are not limited to the particular examples provided, and may be extended to other environments, other system architectures, and so forth, as will be apparent to those of skill in the art in light of the disclosure herein.

FIG. 1 illustrates an example environment 100 for a payment and pricing information service according to some implementations. For instance, the environment 100 may enable a service provider to provide pricing recommendations and other pricing information to a merchant to assist the merchant in determining a price to charge for at least one item offered by the merchant. In the illustrated example, one or more service computing devices 102 of the service provider are able to communicate with one or more merchant devices 104 over one or more networks 106. Further, each merchant device 104 may be associated with a respective merchant 108. For example, one or more first merchant devices 104(1) may be associated with a first merchant 108(1). Further, other merchant devices 104(2)-104(N) may be associated with other merchants 108(2)-108(N).

Each merchant device 104 may include an instance of a merchant application 110 that executes on the respective merchant device 104. The merchant application 110 may provide POS functionality to the merchant device 104 to enable the merchant 108 to accept payments at a POS location. For example, the first merchant 108(1) may use the first merchant device 104(1) to accept payments at a first POS location 112 from one or more buyers 114. In some types of businesses, the POS location may correspond to a store or other place of business of the merchant, and thus, may be a fixed location that typically does not change on a day-to-day basis. In other types of businesses, however, the POS location may change from time to time, such as in the case that the merchant operates a food truck, is a street vendor, a cab driver, or has an otherwise mobile business, e.g., in the case of merchants who sell items at buyers' homes, buyers' places of business, and so forth.

As used herein, a merchant may include any business or other entity engaged in the offering of goods or services for acquisition by buyers in exchange for compensation received from the buyers. Actions attributed to a merchant herein may include actions performed by employees or other agents of the merchant and, thus, no distinction is made herein between merchants and their employees unless specifically discussed. In addition, as used herein, a buyer may include any entity that acquires goods or services from a merchant, such as by purchasing, renting, leasing, borrowing, licensing, or the like. Hereinafter, goods and/or services offered by merchants may be referred to as items. Thus, a merchant and a buyer may interact with each other to conduct a transaction in which the buyer acquires one or more items from a merchant, and in return, the buyer provides payment to the merchant.

In some examples, a buyer 114 may have a buyer device 116 that may execute a buyer application 118. For instance, some buyers 114 may carry buyer devices 116, such as smart phones, tablet computers, wearable computing devices, or the like, as further enumerated elsewhere herein, and some of these buyer devices 116 may have installed thereon the buyer application 118. The buyer application 118 may include electronic payment capability, which enables the buyer 114 to make a payment to the merchant using the buyer application 118, rather than paying with a physical payment card, cash, check, etc. The buyer application 118 may further enable the buyer 114 to check in with the particular merchant, e.g., at the merchant's store or prior to entering the merchant's store, such as to place an order for an item. As one example, the buyer 114 may be able to place an order for an item through the buyer application 118, may skip waiting in a line for ordering items, may pay for the transaction using the buyer application 118, and may proceed directly to an area of the merchant's store to pick up the ordered item.

Accordingly, the merchant 108(1) and the buyer 114 may conduct a transaction by which the buyer 114 acquires an item from the merchant 108(1) at the POS location 112. The merchant application 110 on the merchant device 104(1) may send first transaction information 120(1) to the service computing device 102, e.g., as the transaction is being conducted at the point of sale location 112. For instance, the transaction information 120 may be sent by each of the merchant devices 104 as each transaction is conducted. Of course, in other examples, such as if a particular merchant device 104 is processing transactions offline, the transaction information 120 may be sent in a batch at a subsequent point in time or using other suitable techniques.

The transaction information 120 may include information regarding the time, place, and the amount of the transaction, information related to the item acquired, a type of payment being used (e.g., cash, check, payment card, electronic payment), as well as additional information, such as buyer information. For instance if a payment card is used, the transaction information 120 can include data stored in the payment card, e.g., Track 1 data (cardholder name, card number and other card information). In addition, when completing the transaction a buyer may sometimes provide a receipt email address for receiving a receipt through email. Other examples of transaction information 120 that can be captured include item information, e.g., an itemized listing of the items being acquired, the price being paid for each item, descriptors of the items (size, flavor, color, etc.), geolocation data indicating a geographic POS location of a particular transaction, online/offline card data, data describing the merchant, e.g., a merchant identifier, a merchant category code (MCC), any type of data that is received upon a buyer's authentication into a social network, if any, and various other types of information, as discussed additionally below.

The service computing device 102 may also receive transaction information 120 from the plurality of other merchants 108. For example, a large number of other merchants 108(2)-108(N) may also operate their own merchant devices 104(2)-104(N), respectively, for conducting transactions with respect to their own businesses. Accordingly, transaction information 120(2)-120(N) from the merchant devices 104(2)-104(N) associated with the other merchants 108(2)-108(N) may also be provided to the service computing device 102.

As discussed additionally below, the service computing device 102 may receive the transaction information 120 and may associate the transaction information 120 with merchant information 122 maintained by the service computing device 102. For example, the first transaction information 120(1) may be associated with a first merchant profile 124(1) corresponding to the first merchant 108(1), the Nth transaction information 120(N) may be associated with an Nth merchant profile 124(N) corresponding to an Nth merchant 108(N), and so forth.

In addition, buyer information 126 may be extracted from the transaction information 120 and may be associated with buyer profiles 128. For example, the transaction information 120 for a particular transaction may include a payment card identifier of the payment card that was used as a payment instrument, and may further include the name of the holder of the payment card that was used. Accordingly, a buyer profile 128 may be associated with an identifier of the payment card and/or the name corresponding to the holder of the payment card. Additional transaction information may be related to this buyer profile, such as the POS location of the transaction, the amount of the transaction, the time and date of the transaction, the item(s) acquired through the transaction, descriptive information about the item(s) acquired, the individual price paid for each item, and so forth.

In some examples, the merchant devices 104 may provide explicit item price information 130 to the service computing device 102. For example, the first merchant device 104(1) may provide item price information 130(1) that indicates the prices that the first merchant 108(1) has selected for particular items offered by the first merchant 108(1). Similarly, the other merchant devices 104(2)-104(N) may provide item price information 130(2)-130(N), respectively, that indicates the prices that the other merchants 108(2)-108(N) have selected for the respective items offered by the other merchants 108(2)-108(N). For instance, the item price information 130 may be provided to the service computing device 102 by the merchant application 110, such as when the merchant 108 is setting up or otherwise implementing the payment service on a respective merchant device 104. For example, when the merchant 108 is setting up the merchant application 110 to accept payments for particular items offered by the merchant 108, the merchant 108 may enter prices for the particular items along with other item information for the particular items. In some cases, the merchants 108 may determine the pricing of particular items on their own using various techniques, while in other cases, the merchants may determine pricing based at least in part using the pricing information service employing the price determination techniques discussed herein. In either event, the item price information 130 for various items, along with any descriptors or other details of the various items, may be provided to the service provider and may be included in the respective merchant profiles 124 associated with the respective merchants 108. In addition, when the merchants 108 decide to update or otherwise change prices for various items, these changes may be included as additional item price information 130.

The service computing device 102 may include a price determination module 132 that may analyze the merchant profiles 124 and/or the buyer profiles 128 for determining pricing information 134 to send to one or more of the merchants 108. For instance, the service computing device 102 may send the pricing information 134 with an electronic communication 136 to the merchant device 104(1). The communication 136 may include the pricing information 134 for one or more items offered by the merchant 108(1). For example, the pricing information 134 may be sent to the merchant device 104(1) in response to e.g., a request received from the merchant device 104(1), or in response one or more triggers determined by the service computing device 102, such as determining that a particular merchant's buyer base has changed, costs have changed, or other market changes have occurred that may cause the merchant to want to change a price of one or more items. In some cases, the merchant device 104(1) may present the pricing information 134 in a window or at a designated location in a user interface (UI) presented on a display 138 associated with the merchant device 104(1).

As illustrated in the example of FIG. 1, suppose that the service computing device 102 has sent the communication 136 including the pricing information 134 for a particular item, i.e., item A in this example, to the first merchant device 104(1). The pricing information 134 may include a price range 140 of prices charged for the item by merchants who are determined to be similar to the first merchant 108(1), such as by being classified in a same merchant category as a first merchant and/or in a same location category as the first merchant. The price range 140 may include any of a low price 142, an average price 144, a median price 146, or a high price 148. For example, the low-price 142 may be the lowest price at which item A is offered by similar merchants in the region. Additionally, the high price 148 may be the highest price at which item A is offered among similar merchants in the region. Furthermore, the average price 144 and the medium price 146 may be the average price and the median price, respectively, among all merchants that are determined by the service computing device 102 to be similar to the first merchant 108(1). As discussed in detail elsewhere herein, similar merchants may be classified in the same merchant category and/or in the same location category as the first merchant 108(1).

In addition, the pricing information 134 may include a recommended price 150 which may be a recommended price personalized for the first merchant 108(1). For example, the recommended price may be determined based on a number of factors, such as the average price 144 or median price 146, one or more characteristics of buyers that the merchant has expressed an interest in attracting, an overall pricing strategy of the merchant for the business, a cost of item A for the merchant, a profit margin desired by the merchant, a volume of the items that the merchant wishes to sell over a specified period of time, and so forth. In some examples, as discussed additionally below, the merchant application may present a user interface to enable the merchant to interact with the pricing information 134, such as to determine different projected sales volumes for different possible prices, or the like.

In the example of FIG. 1, for determining the pricing information 134, the service computing device 102 may receive transaction information 120 for a large number of POS transactions between buyers 114 and merchants 108 at a plurality of POS locations 112 for a variety of items, which may include a plurality of transactions for item A. Further, in some examples, the service computing device 102 may receive the item price information 130 directly from the plurality of merchants 108. The price determination module 132 may analyze the received transaction information 120 and/or the received item price information 130 for determining pricing information 134 that is personalized for the first merchant 108(1). In some cases, the pricing information 134 provided to the first merchant 108(1) may indicate the prices that other merchants in the same geographic region are charging for item A.

As another example, the price determination module 132 may determine, e.g., from the buyer profiles 128, the price sensitivity of the buyers 114 that already shop at the first merchant 108(1). For instance, the price determination module 132 may determine whether the first merchant would be likely to lose customers if the first merchant were to increase the price of item A. For example, the price determination module may determine a subset of the buyer profiles that contain transaction information indicating the buyers have purchased item A from other merchants. The price determination module may determine how much the buyers paid for item A at the other merchants. If the buyers 114 corresponding to the subset typically paid more for item A at the other merchants than the price that the first merchant 108(1) is currently charging, then it is likely that the first merchant 108(1) would be able to increase the price of item A without losing the buyers as existing customers. On the other hand, if the buyers corresponding to the subset typically paid the same or less than the price that the first merchant 108(1) is currently charging for item A, then the price determination module may recommend that the first merchant maintain or reduce the price of item A.

In some examples, the first merchant 108(1) can specify to the price determination module 132 the type of customer to which the merchant would like to cater and/or the type of business model under which the merchant would like to operate. As mentioned above, as one example, the merchant may wish to cater to a smaller number of high-end customers and charge higher prices or, as another example, the merchant may wish to cater to a larger volume of customers for lower prices, and not provide as much personalized service to each customer. Accordingly, the recommended price 150 may take into consideration the desired customer base and business model of the first merchant 108(1) when determining the personalized pricing information 134 for the first merchant 108(1). Thus, implementations herein may assist the first merchant 108(1) in managing, at least in part, the type of buyer with which the first merchant 108(1) will do business and the type of business the first merchant 108(1) will operate.

In some examples, the price determination module 132 may send the pricing information 134 to the first merchant 108(1) in response to determining that the customer base of first merchant 108(1) has changed since the last time the first merchant 108(1) set the price for item A. For example, in response to this finding, the price determination module 132, may recommend that the first merchant 108(1) adjust the prices charged for one or more items, including item A, based on the change in the customer base of the first merchant 108(1). For instance, to maintain the current customer base, the first merchant 108(1) may have to adjust the pricing of item A downward, if the buyer profiles 128 of the regular buyers 114 indicate that the current buyers 114 are paying less for item A at other merchants. Alternatively, the price determination module 132 may recommend that the first merchant 108(1) increase the price of item A if the buyer profiles of the regular buyers indicate that the first merchant 108(1) is able to raise the price currently charged for item A.

Further, in some examples, the first merchant 108(1) may have specified a relatively fixed profit margin when requesting pricing information. Accordingly, the price determination module 132 may recommend that the first merchant 108(1) adjust the pricing of item A up or down to maintain the fixed margin for item A. As another example, the first merchant 1081) may provide financial data to the price determination module 132, such as overhead costs, inventory costs, desired profit margin, and so forth, to enable the price determination module 132 to take this financial data into consideration when determining pricing for item A, such as for maintaining particular profit margins, and so forth.

In some examples, the pricing information 134 may be provided to the first merchant 108(1) when the first merchant 108(1) is starting his or her business, such as to enable the first merchant 108(1) to determine pricing for item A and various other items to be offered by the first merchant 108(1). As mentioned above, the pricing information 134 may be personalized for the particular customer base desired by the particular merchant. For instance, the price determination module 132 may determine, from the buyer profiles 128, a subset of the buyer profiles that share one or more common characteristics desired by the first merchant 108(1). For example, the subset may be selected based on one or more common demographic characteristics, such as: buyer residence information; buyer age range; buyer sex; buyer affluence; buyer ethnicity; buyer language; buyer education; buyer marital status; buyer occupation; buyer religion; buyer political affiliation; buyer memberships in associations, and so forth. Additionally, or alternatively, the one or more common buyer characteristics may be selected based on shopping habits, such as type of items that the buyers purchase, a time of day and day of the week on which purchases tend to be made, categories of merchants at which the buyers shop, average amount spent per transaction, and so forth. As one example, suppose that the price determination module 132 determines, from the buyer profiles 128, a subset of the buyer profiles 128 that have a plurality of the above-listed characteristics. The price determination module 132 may determine the price that the subset of buyers typically pay for item A at merchants similar to the first merchant 108(1), so that the first merchant 108(1) can price item A appropriately for the buyers to which the first merchant 108(1) would like to cater. Of course, additional marketing or other efforts, in addition to appropriate pricing, may also be necessary to get the desired buyers to begin frequenting the first merchant's business. Furthermore, as new customers become regular customers, the price determination module 132 may recommend that the merchant adjust the price of item A and/or various other items based on the transaction information of the buyer profiles corresponding to the buyers that are regularly conducting transactions with the first merchant 108(1). Numerous other variations will be apparent to those of skill in the art having the benefit of the disclosure herein.

Figure 2:
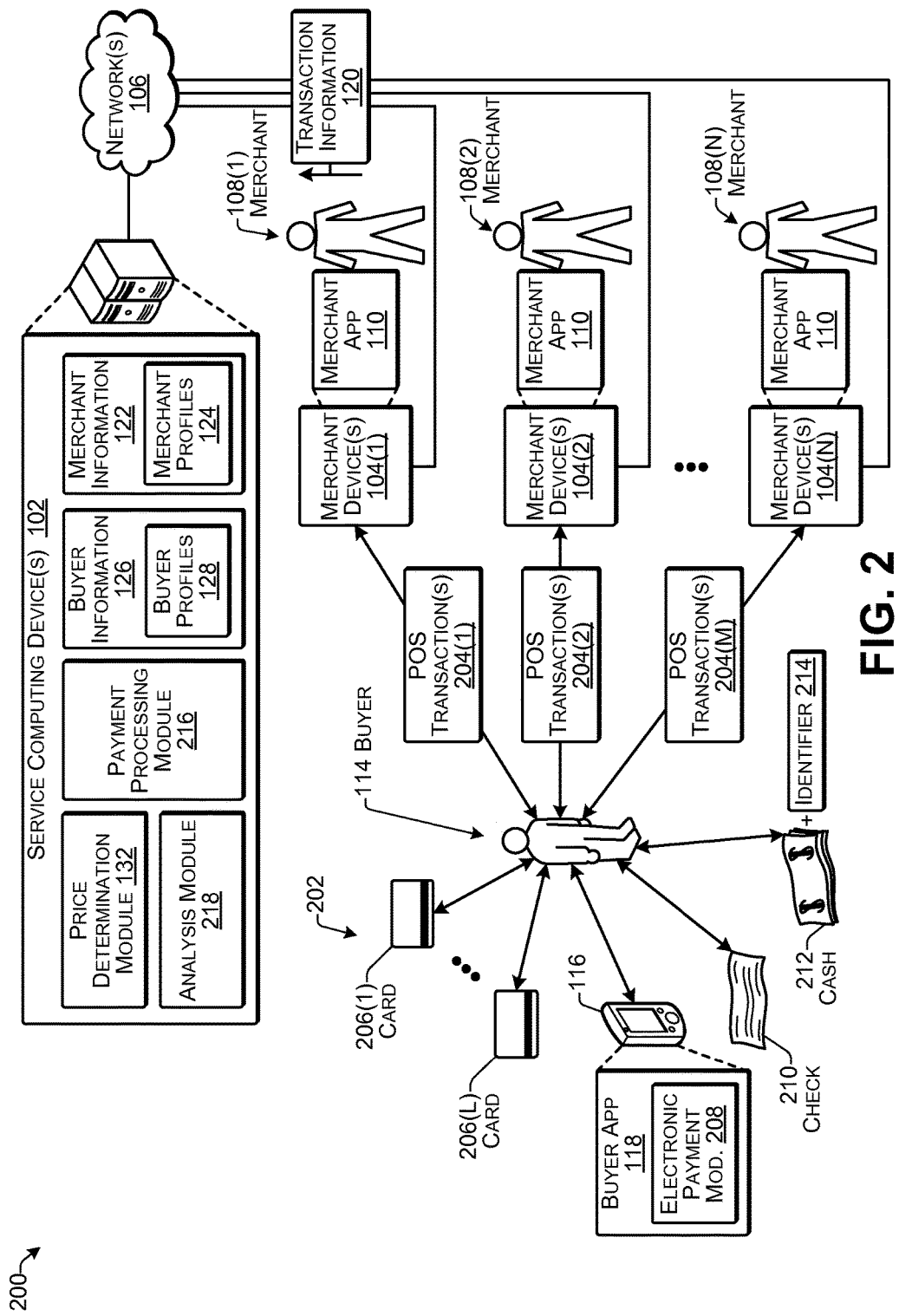
FIG. 2 illustrates an example environment for enabling point of sale transactions between merchants and buyers according to some implementations.

FIG. 2 illustrates an example environment 200 for enabling transactions between merchants and buyers according to some implementations. In this example, a buyer 114 may use any of a variety of different payment instruments 202 when participating in a plurality of POS transactions 204(1)-204(M) with a plurality of different merchants 108(1)-108(N). For example, a buyer may typically have a plurality of payment cards 206(1)-206(L), such as credit cards, debit cards, prepaid cards, and so forth, that the buyer 114 may use for conducting various different POS transactions 204. Further, in some examples, the payment cards 206 may include one or more magnetic strips for providing card and buyer information when swiped in a card reader. In other examples, other types of payment cards 206 may be used, such as smart cards having a built-in memory chip, a radiofrequency identification tag, and so forth.

A buyer 114 may select a particular payment card 206 for use at a particular POS location and/or for use with a particular merchant 108 for any of a variety of different reasons and may often use different payment cards. For example, the buyer 114 may not always use the same payment card 206 with the same merchant 108 for every POS transaction 204 conducted with that merchant 108. In such scenarios, the transaction information that describes transactions that are conducted using a first payment instruments 202 may be separate or disconnected from the transaction information 120 that describes other transactions conducted using a second payment instrument 202. Such disconnected sets of transaction information 120 can make it difficult to capture a holistic view of a buyer's shopping behavior and preferences. Thus, in some examples herein, various techniques may be used for matching transaction information corresponding to multiple different payment instruments to a single buyer profile. This enables creation of a single or more complete buyer profile to describe the shopping behavior of the corresponding particular buyer. Such buyer profiles 128 of respective buyers 114 can be aggregated and the information contained therein evaluated to provide merchants with data describing their customer base, and to provide the merchants with customized or otherwise personalized pricing recommendations.

In addition to payment cards, a buyer 114 may carry a buyer device 116, as discussed above. The buyer device 116 may include the buyer application 118, which enables an associated electronic payment account to be used as a payment instrument 202. For example, the buyer application 118 may include an electronic payment module 208 that uses an electronic payment account of the buyer 114 for making electronic payments for transactions. In some cases, the electronic payment account of the buyer 114 may be linked to one of the buyer's payment cards 206, such as a credit card. Accordingly, the buyer application 118 may enable the buyer 114 to pay for a transaction with the linked credit card without having to produce the credit card, thereby enabling a card-less payment to the merchant with the credit card. The buyer application 118 and the corresponding electronic payment account, can be associated with various buyer information including, for example, the buyer's name, information describing the payment card linked to the electronic payment account, and an email address linked to the electronic payment account to which receipts can be sent for electronic payment transactions that are conducted by the buyer 114 using the buyer application 118. Further, as an alternative to linking the electronic payment account to a credit card, the electronic payment account may be a different type of account, such as a checking account, a debit account, a savings account, a prepaid account having a prepaid quantity of money deposited therein, or the like.

In addition to the above discussed payment instruments, the buyer 114 may also optionally pay with a check 210 or cash 212. For example, if the buyer 114 pays with check 210 or cash 212, the merchant may sometimes also receive an identifier 214 that provides additional identification information about the buyer 114. For instance, a merchant may have a club card or other incentive that enables identification of the buyer to the merchant and thereby to the merchant application 110. As an example, the buyer 114 may provide a telephone number associated with the buyer 114, and this telephone number along with other transaction information may be cross-referenced to a matching telephone number in an existing buyer profile 128 to associate the transaction with the existing buyer profile 128. Additionally, or alternatively, the buyer 114 may provide an email address in association with a particular transaction to receive a receipt for the transaction by email, rather than receiving a paper receipt, and the email address may be used to associate the transaction with an existing buyer profile 128. Alternatively, if the buyer 114 pays with a check 210, the buyer 114 may be required to provide buyer information in association with the check 210, which, in addition to a checking account number, may include telephone number, address, and other identification information. Accordingly, this information may also be associated with the particular transaction, and may thereby enable the transaction to be associated with an existing buyer profile 128. Furthermore, as discussed additionally below, if an existing buyer profile 128 that matches the transaction information for a new transaction cannot be located, a new buyer profile 128 may be created.

The service computing device 102 may include a payment processing module 216 that may receive at least transaction information 120 for processing payments made through the merchant application 110 and, in some cases, the buyer application 118. For example, the payment processing module 216 may receive transaction information 120, such as an amount of the transaction, and may verify that a particular payment card can be used to pay for the transaction, such as by contacting a card clearinghouse computing device or other bank computing device, as discussed additionally below. Furthermore, in some examples, the payment processing module 216 may redirect payment information for transactions to be made using payment cards 206 to a bank computing device (not shown in FIG. 2), while in other examples, the merchant devices 104 may communicate directly with an appropriate bank computing device for approving or denying a transaction using a particular payment card 206 for a particular transaction. Additional details of payment processing are discussed below.

The service computing device 102 may further include the analysis module 218 mentioned above. For example, the analysis module 218 may receive the transaction information 120 and associate the transaction information 120 with appropriate merchant profiles 124 and appropriate buyer profiles 128. Thus, as discussed additionally below, the analysis module 218 may compare received transaction information 120, which may include an identifier of the merchant device 104 or an identifier of an instance of a merchant application 110 from which the transaction information 120 is received for associating the transaction information 120 with a particular merchant profile 124. Furthermore, the analysis module 218 may extract buyer information such as credit card identifier, buyer name, buyer email address, and various other pieces of buyer information from the transaction information 120, and may match this information with an existing buyer profile 128. If no match is found, then a new buyer profile 128 may be created.

The buyer profiles 128 and/or merchant profiles 124 described herein may be created and maintained using any suitable types of data structures, and using any suitable data storage or database techniques. In some examples, the transaction information and other profile information may be maintained in a relational database in which pieces of information for individual buyer profiles may be stored distinctly from one another, but are related to or otherwise associated with each other in the relational database. For instance, a particular buyer profile 128 may be obtained by generating a view of a portion the data related in the database to the particular buyer profile, or by otherwise extracting the data from the database. Alternatively, of course, other types of storage techniques may be used for generating and maintaining the buyer profiles 128 and/or the merchant profiles 124. Furthermore, as discussed below, in some examples a probabilistic model may be used to determine within a threshold level of confidence that transaction information 120 from a particular transaction should be associated with a particular buyer profile 128.

Figure 3:
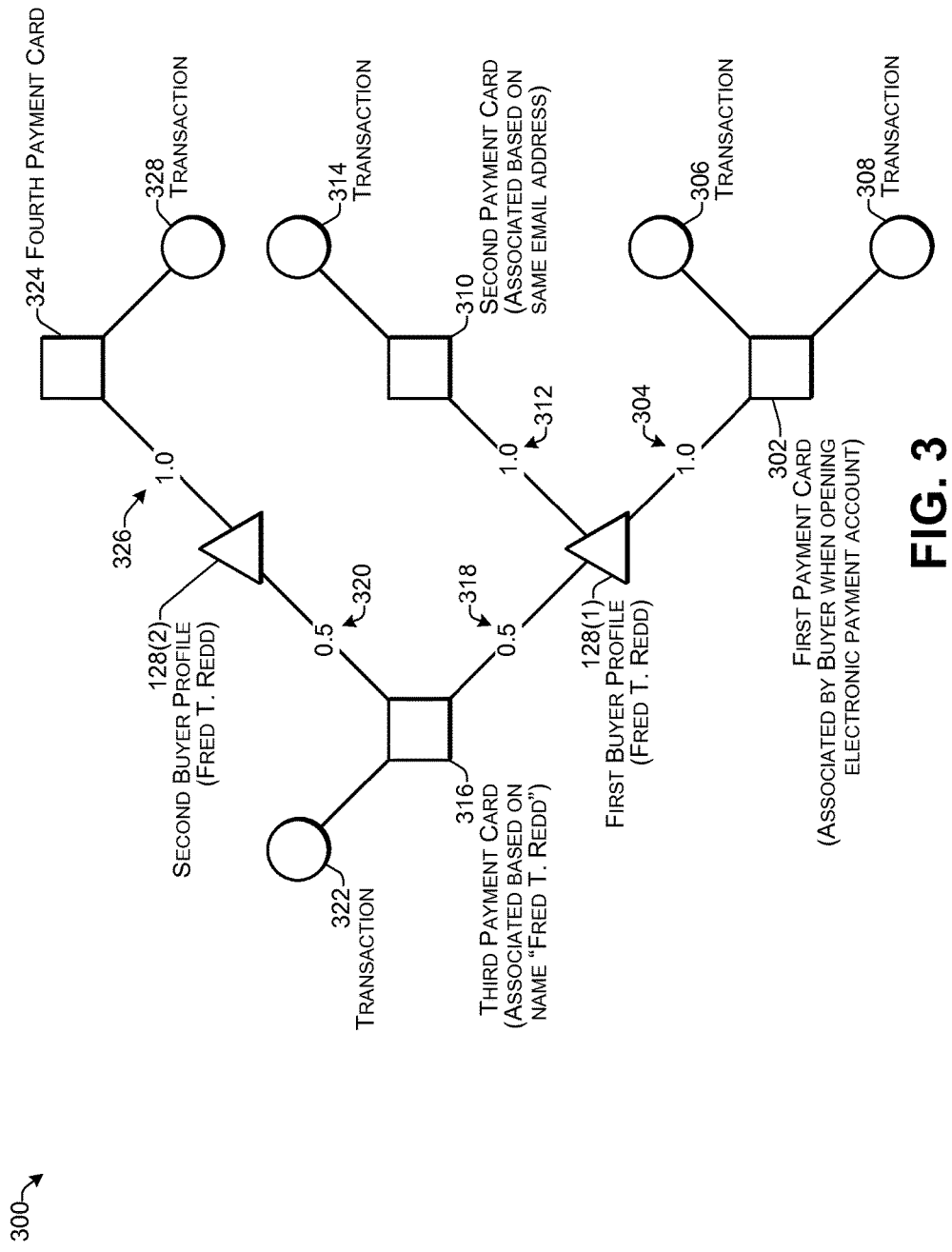
FIG. 3 illustrates an example probabilistic model for associating transactions with buyer profiles according to some implementations.

FIG. 3 illustrates an example probabilistic model 300 for associating transactions with buyer profiles according to some implementations. In this example, the probabilistic model 300 includes a weighted graph in which triangular nodes represent buyer profiles, such as a first buyer profile 128(1) and a second buyer profile 128(2), respectively. The probabilistic model 300 indicates the probabilities that particular transactions are associated with particular buyer profiles, such as based on buyer use of different payment instruments, as discussed above with respect to FIG. 2, and further based on the information included with each transaction and the information already included in each buyer profile 128. The probabilistic model 300 can be used to determine whether to associate a particular transaction with a particular buyer profile, and to determine when to merge buyer profiles 128 and/or to indicate when new buyer profiles should be created.

In the example of FIG. 3, the probabilistic model 300 shows that the triangular node that represents the first buyer profile 128(1) is associated with a square node 302, which represents a first payment card with a 1.0, i.e., 100 percent, confidence score, as indicated at 304. The confidence score 304 indicates that the financial transactions conducted using the first payment card correspond to the first buyer profile 128(1) with a confidence of 100 percent, but, of course, this confidence score may not necessarily authorize a buyer to use the corresponding payment card, as such authorizations are managed separately. Circular nodes 306 and 308 represent respective transactions that were conducted using the first payment card, and are thereby associated with the node 304. Accordingly, the transaction information corresponding to the transactions 306 and 308 can be associated with the first buyer profile 128(1) with a confidence level of 100 percent.

The triangular node that represents the first buyer profile 128(1) is also associated with a square node 306, which represents a second payment card with a 1.0 confidence score. For example, suppose that the first buyer associated a particular email address with the first buyer profile 128(1), such as when signing up for an electronic payment account. Subsequently, suppose that the first buyer used the second payment card for a transaction and requested that a receipt be sent to the same email address as the email address associated with the first buyer profile. Accordingly, based on matching of the email address associated with the second card and the email address previously associated with the first buyer profile 128(1), the second payment card may be associated with the first buyer profile with a 1.0 confidence score, as indicated at 312. This confidence score 312 indicates that transactions, such as a transaction represented by a circular node 314, conducted using the second payment card may be included in the first buyer profile 128(1) with a confidence level of 100 percent.

In addition, the model 300 shows the triangular node 302 that represents the first buyer profile 128(1) and the second triangular node that represents the second buyer profile 128(2) are both associated with a square node 316, which represents a third payment card. For example, suppose that when the transaction information including the third payment card information was received, an identifier associated with the third payment card did not the match card identifiers in any current buyer profiles. Further, suppose that the name associated with the third payment card (Fred T. Redd) is the same as the names associated with two buyer profiles, i.e., the first buyer profile 128(1) and the second buyer profile 128(2). Accordingly, the third card may be associated with the first buyer profile 128(1) and the second buyer profile 128(2) using a 0.5, or 50 percent, level of confidence as the confidence score, as indicated at 318 and 320, respectively. Consequently, the model 300 indicates that there is a 50 percent probability that a transaction represented by a circular node 322 conducted using the third payment card was performed by the first buyer associated with the first buyer profile 128(1) and a 50 percent probability that the transaction was conducted by the second buyer associated with the second buyer profile 128(2).

Accordingly, in some examples, the transaction information for the transaction represented by node 322 may not be associated with either of the first profile 128(1) or the second profile 128(2), since a name is not always a reliable indicator of an individual identity. However, in other examples, other information included with the transaction information may be taken into consideration to change the confidence levels 318, 320. For instance, the second buyer profile 128(2) may have a fourth payment card associated, as indicated by square node 324, with a confidence score of 1.0, as indicated at 326. Accordingly, a transaction corresponding to circular node 328 may be associated with the second buyer profile 128(2) with 100 percent confidence.

As an example, suppose a comparison of the item purchase information from the transaction associated with node 322 with the item purchase information for the transactions associated with nodes 306, 308, 314 and 328 indicates that the transaction associated with node 322 took place at the same merchant POS location and at the same approximate time of day, but on a different date, as the transaction associated with node 308. Further, suppose that the transaction associated with node 328 and associated with the second buyer profile 128(2) took place in a different city from the transactions associated with nodes 306, 308, 314 and 322. Furthermore, suppose that the transaction associated with node 308 is for a medium-sized vanilla latte and a blueberry bagel, and that the transaction associated with node 322 is for a medium-sized vanilla latte and a cinnamon bagel. Accordingly, in some instances, the transaction information for the respective transactions may be used to substantially change the confidence scores 318 and 320, which, if the confidence score exceeds a threshold, results in the transaction information associated with node 322 being associated with the first buyer profile 128(1).

As one example, probabilistic model 300 may include a trained statistical model that accounts for numerous pieces of information included in the transaction information for various types of transactions, such as location of the transaction, type or category of merchant, time of day of the transaction, day of the week, items purchased through the transaction, descriptors of items purchased, amount paid for the transaction, and so forth, in addition to information such as payment card identifier, name associated with the payment card, and any other information, such as email addresses, home or business addresses, phone numbers, etc. The statistical model may be initially trained using a set of training data, checked for accuracy, and then used for matching transactions with particular buyer profiles by determining confidence scores, and associating a particular transaction with a particular buyer profile when a confidence score exceeds a specified threshold of confidence. The statistical model may be periodically updated and re-trained based on new training data to keep the model up to date. Examples of suitable statistical models that may be incorporated into the one or more probabilistic models 300 herein may include regression models, such as linear regression models, and stochastic models, such as Markov models, hidden Markov models, and so forth.

For example, suppose that, based on analysis of the item purchase information for the transactions associated with nodes 306, 308, 314, 322 and 328, the confidence score 318 is greater than 0.8, while the confidence score 320 is correspondingly less than 0.2. As one example, suppose that the threshold for associating transaction information with a buyer profile is 0.8. Then, if the probabilistic model 300 indicates a confidence score that is greater than 0.8, the transaction information associated with the node 322 may be associated with the first buyer profile 128(1). Thus, the buyer profiles 128 may indicate the item purchase activity and payment activity of an associated buyer across multiple payment accounts or other payment instruments.

Accordingly, the analysis module 218 may be configured to harmonize the transaction information that is received from various merchant devices so that orphan or otherwise disconnected sets of transaction information that correspond to different financial payment instruments, e.g., different payment cards or electronic payment accounts, etc., can be matched to or otherwise associated with particular buyer profiles. In some examples, the analysis module 218 is configured to match financial data corresponding to different financial accounts using the one or more probabilistic models of buyer profiles and respective transactions conducted using the different financial payment instruments. In some examples, the analysis module 218 can apply the probabilistic model 300, for example, by utilizing one or more of a weighted graph model, a probabilistic data store and/or a trained statistical model.

To generate and/or apply the probabilistic model 300, the analysis module 218 may be configured to match, either exactly or heuristically, buyer information and/or item information included in the transaction information using one or more common characteristics. Characteristics that can be used to match transactions include a payment instrument number, e.g., a debit card number or credit card number, Track 1 data from the payment card magnetic strip (e.g., a name of the buyer involved in the transaction), an email address linked to the transaction (e.g., a receipt email address) or the name used by an buyer in an email username string, e.g., "fred.redd@example.com," to name a few examples. However, the techniques described herein can be performed using any type of characteristic that can identify a buyer. Further, some characteristics, such as email address, phone number or payment card identifier, may have a higher level of confidence than other characteristics such as buyer name.

Thus, the probabilistic model 300 may represent associations between buyer profiles, respective financial accounts or other payment instruments, and the transactions associated with those accounts or other payment instruments. After finding a match between a buyer profile and transaction information for a particular transaction, the probabilistic model 300 or the analysis module 218 can assign a confidence score that is associated with that match. For example, some types of matches, such as email addresses, payment card identifiers, telephone numbers, and the like, may have such high confidence levels that a confidence score of 100 percent or 1.0 may be assigned if there are no other matching buyer profiles. For heuristic matches, the confidence score is a probability that represents a likelihood that a particular transaction is associated with a particular buyer profile, rather than a different buyer profile. The analysis module 218 can update these probabilities as transaction information describing new transactions is received from the merchant devices.

The analysis module 218 can use the probabilistic model to create or add to buyer profiles to provide a holistic view of a corresponding buyer's shopping behavior and preferences, as compared to other buyers. For example, for a particular buyer, the analysis module 218 can determine based on the buyer's history of transactions (using, for example, the respective itemized listing of purchases associated with those transactions) that the particular buyer is likely to prefer a vegetarian diet because the buyer orders less meat-based items than other similar buyers. This probabilistic data point can then be added to the particular buyer's buyer profile.

Some types of information can be associated with a buyer profile in a probabilistic manner. For example, the buyer's gender and age may be determined within a certain confidence level based on the buyer's name and third-party data, e.g., data from the U.S. Census Bureau, data from a social network site, data from a microblog site, or other online presences of the various different buyers. The buyer's dietary restrictions or habits can be probabilistically determined from the buyer's itemized listings of purchases. For example, if the buyer always orders soy-based coffee, then a probabilistic data point indicating that this buyer is lactose intolerant may be included in the corresponding buyer profile. Geographic locations corresponding to the buyer's home and/or work locations can be probabilistically determined based on the geographic locations of merchants where the buyer conducts transactions. For instance, the analysis module 218 can determine a likely home or work location based on a geographic location at which a transaction was conducted with a taxi and the corresponding amount charged by the taxi. The analysis module 218 can determine a radius beginning from the drop-off geographic location and based on how far the taxi could travel for the amount that was charged. Similarly, the analysis module 218 can add probabilistic data points referencing the buyer's commutes to certain geographic locations. For example, the analysis module 218 can probabilistically determine the buyer's commutes to certain geographic locations based on purchases made while on a predictable path the buyer follows on certain days and at certain times.

Various hobbies and other activities can also be probabilistically associated with the buyer profile of a particular buyer. For example, the analysis module 218 can evaluate the types of merchants at which the buyer conducts transactions. The categories of these merchants can be determined, for example, using the merchants' self-declared business category or using merchant category codes (MCC). The MCC is a four-digit number assigned to a business by credit card companies (e.g., American Express®, MasterCard®, VISA®) when the business first starts accepting payment cards as a form of payment. The MCC is used to classify the business by the type of goods or services provided by the business. Accordingly, if the buyer is regularly shopping at a particular category of merchant, e.g., a bike shop, then the buyer can be probabilistically identified as a cyclist. For example, if the buyer purchases bike lights from a bike shop and returns to the bike shop the following week to purchase a spare tire, then a probabilistic data point indicating that the buyer is a cyclist might be added to the buyer's buyer profile.

As another example, the buyer's preferences for certain types of clothing, shoes, sizes, and colors can also be determined from the item information associated with the buyer's transactions. For example, if the buyer purchases red medium-sized shirts, then probabilistic data points indicating that the buyer prefers the color red, red shirts, and medium-sized shirts, can be added to the corresponding buyer profile. As described below, buyer profiles for multiple buyers can be aggregated in various ways to provide pricing recommendations and other information to merchants based on buyer characteristics.

Figure 4:
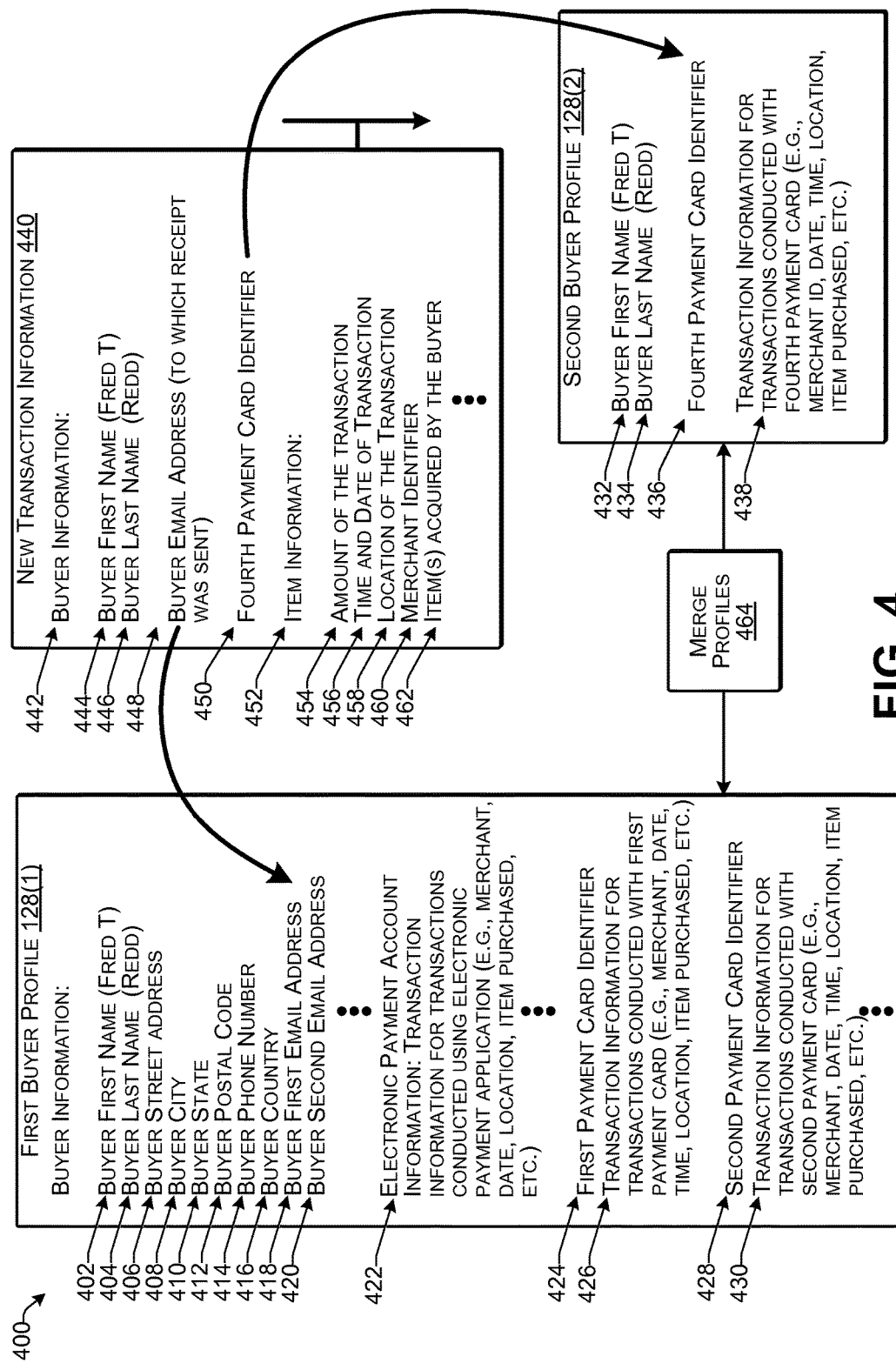
FIG. 4 is a block diagram illustrating an example of merging buyer profiles based on transaction information according to some implementations.

FIG. 4 illustrates an example conceptual diagram 400 of merging buyer profiles based on newly received transaction information according to some implementations. In this example, as discussed above with respect to FIG. 3, the first buyer profile 128(1) and the second buyer profile 128(2) are considered to be separate buyer profiles because the only connection is that the same name (Fred T. Redd) is associated with both buyer profiles, which, taken alone, typically may not provide sufficient confidence for merging two profiles. This example, illustrates a portion of the information that may be included in the first buyer profile 128(1), including buyer first name 402, buyer last name 404, buyer street address 406, buyer city 408, buyer state 410, buyer postal code 412, buyer phone number 414, buyer country 416, buyer first email address 418, buyer second email address 420, and so forth, depending on the information obtain from the buyer and/or obtained over time through transactions conducted by the buyer. The first buyer profile 128(1) may further include electronic payment account information 422, which may include transaction information for transactions conducted using the electronic payment account associated with the first buyer profile 128(1).

In addition, the first buyer profile 128(1) may further include an identifier 424 for a first payment card associated with the first buyer profile 128(1) and transaction information 426 for transactions conducted using the first payment card. As one example, rather than storing an actual credit card number in association with a buyer profile, a one-way hash function may be used to generate a card identifier, or various other encryption techniques may be used to protect the security of the actual card information. Further, individual payment cards may be individually distinguished by the information on the card. For example, a single credit card number may be shared between spouses or other family members, but each card may have additional information to distinguish one card from the other, and thereby distinguish a transaction conducted by a first family member from a transaction conducted by a second family member. In addition, the first buyer profile 128(1) may further include a payment card identifier 428 for a second payment card associated with the first buyer profile 128(1) and transaction information 430 for transactions conducted using the second payment card.

In this example, and as a continuation of the example of FIG. 3 discussed above, the second buyer profile 128(2) includes substantially less information than the first buyer profile 128(2). For instance, the second buyer profile 128(2) merely includes the buyer first name 432, buyer last name 434, a fourth payment card identifier 436, and transaction information 438 for transactions conducted using the fourth payment card.

Suppose that the service computing device has received new transaction information 440, which includes buyer information 442, such as the buyer first name 444, buyer last name 446, a buyer email address 448 to which a receipt was sent, the fourth payment card identifier 450, and item purchase information 452 for the new transaction 440 conducted using the fourth payment card. For example, the item purchase information 452 may include a total amount of the transaction 454, a time and date of the transaction 456, a location 458 of the transaction, such as a geolocation, street address, etc., a merchant identifier 460 of a merchant that participated in the transaction, identification of item(s) 462 acquired by the buyer through the transaction, and may further include various other information related to the transaction (not shown), such as the price paid for each item, any descriptors associated with each item, such as color of the item, size of the item, flavor of item, and so forth.

Furthermore, suppose that the analysis module determines that the email address 448 matches the buyer first email address 418 in the first buyer profile 128(1) and that the fourth payment card identifier 450 matches the fourth payment card identifier 436 associated with the second buyer profile 128(2). Consequently, as an email address and a payment card may typically be considered identifiers of a high level of confidence, then in some examples herein, the second buyer profile 128(2) may be merged with the first buyer profile 128(1), as indicated at 464. For example, to perform the profile merging 464, the information in the second buyer profile 128(2), such as the fourth payment card identifier 436 and the transaction information 438 may be related to or otherwise associated with the first buyer profile 128(1), and the second buyer profile 128(2) may be deleted, marked for deletion, marked inactive, or the like.

Figure 5:
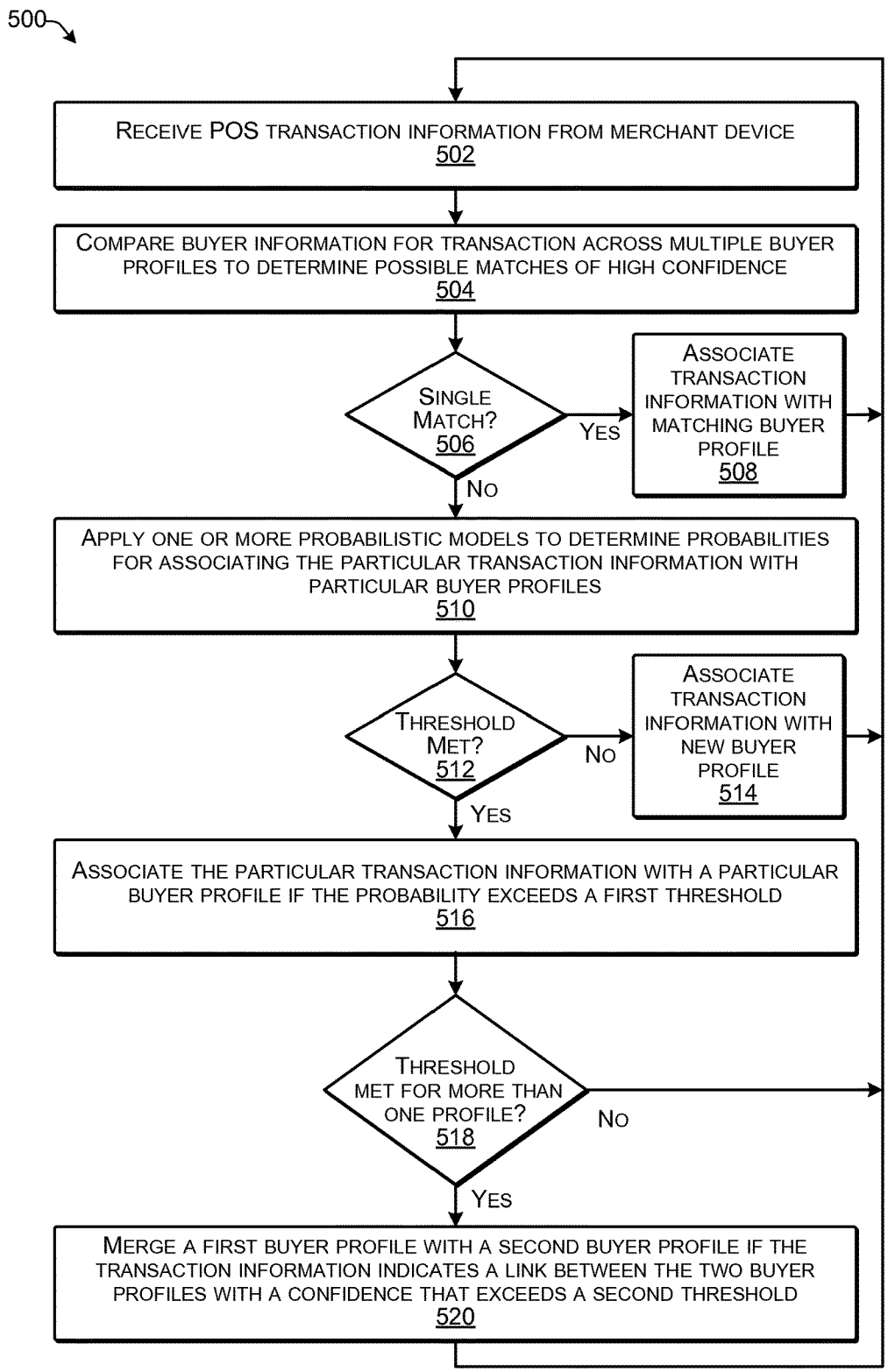
FIG. 5 is a flow diagram illustrating an example process for associating transactions with buyer profiles according to some implementations.

FIG. 5 is a flow diagram 500 illustrating an example process for associating transactions with buyer profiles according to some implementations. The process of FIG. 5 and the processes of FIGS. 8 and 9 below are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. Accordingly, in some implementations, the example process 500 of FIG. 5 may be executed by one or more processors of the service computing device 102 of the service provider.

At 502, the one or more computing devices may receive POS transaction information from a merchant device associated with a merchant. For example, as discussed above with respect to FIGS. 1 and 2, a plurality of the merchant devices associated with a plurality of different merchants may send transaction information for a plurality of transactions to the service computing device 102. Each instance of transaction information may include various amounts of buyer information and item purchase information, such as discussed above with respect to FIGS. 3 and 4.

At 504, the one or more computing devices may compare the transaction information across multiple buyer profiles to determine possible matches with existing buyer profiles. For example, as discussed above with respect to FIGS. 3 and 4, buyer information from the transaction information may be compared with buyer information associated with existing buyer profiles.

At 506, the one or more computing devices may determine whether there is a match of high confidence with a single buyer profile, such as through matching payment card identifiers, email addresses, telephone numbers, payment account identifiers, a merchant incentive program identifier, or other identifiers of high confidence. For example, the confidence of a match for these types of identifiers may be sufficiently high that additional comparisons may not be required. However, in other examples, additional comparison may be performed as discussed below, such as to guard against the possibility that an incorrect phone number or email address was entered, fraudulent use of payment cards, and so forth.

At 508, when there is a match of high confidence with a single particular buyer profile, the one or more computing devices may relate or otherwise associate the transaction information to the matching buyer profile. For example, in the case of a relational database, the transaction information may be related in the database to the buyer profile. In other types of storage systems, the transaction information may be stored with a buyer profile, or may be otherwise associated with the buyer profile using any suitable techniques.

At 510, when there is not a high confidence match with a particular buyer profile, the one or more computing devices may apply one or more probabilistic models to determine probabilities, such as confidence scores, for relating the particular transaction information with particular buyer profiles. For instance, as discussed above with respect to FIGS. 3 and 4, the one or more probabilistic models may include one or more trained statistical models that take into consideration numerous different aspects of the item purchase information such as time, date, place, merchant, items purchased, information about items purchased, and so forth, as well as the buyer information associated with the transaction, as discussed above.

At 512, the one or more computing devices may determine whether a threshold level of confidence is met for associating the transaction information with any of the existing buyer profiles.

At 514, if the threshold level of confidence is not met for any of the existing buyer profiles, the one or more computing devices may associate the transaction information with a new buyer profile. For example, the buyer information included with the transaction information may be used to generate a new buyer profile and the transaction information may be associated with the new buyer profile.

At 516, if the threshold level of confidence is met for at least one buyer profile, the transaction information may be associated with that buyer profile.

At 518, the one or more computing devices may determine whether a threshold level of confidence is met for more than one profile. For example, as discussed above with respect to FIG. 4, the transaction information may include a first piece of buyer information, such as a payment card identifier, that can associate the transaction information with a high-level confidence to a first buyer profile, and may also include another piece of buyer information such as an email address, phone number, or the like, that can associate the transaction information with a second buyer profile.

At 520, if the transaction information can be associated with multiple buyer profiles with a high-level of confidence that exceeds a second threshold, the first buyer profile and the second buyer profile may be merged together as discussed above with respect to FIG. 4. In some examples, the second threshold level of confidence may be different from the first threshold level of confidence. Further, other information included in the multiple buyer profiles may be examined to determine that there is not a conflict to the decision to merge the multiple buyer profiles. The process may subsequently begin processing the next transaction received from the merchant devices.

Figure 6:
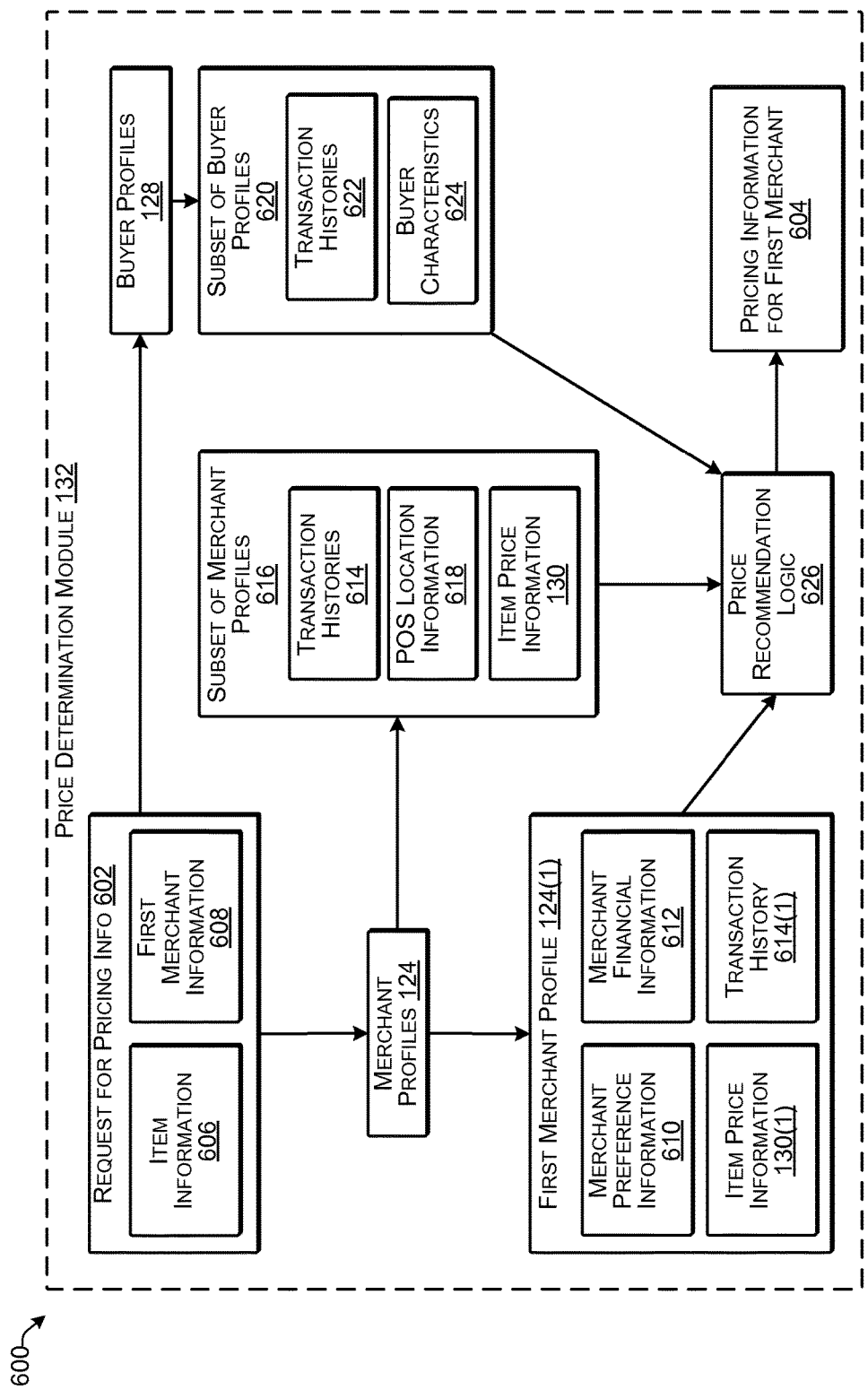
FIG. 6 is a block diagram illustrating an example of determining pricing information for a merchant according to some implementations.

FIG. 6 is a conceptual diagram 600 illustrating an example of determining pricing information for a merchant according to some implementations. As mentioned above, the price determination module 132 can determine one or more prices to recommend to a particular merchant for one or more items offered by the merchant. The price determination module 132 may generate pricing information 604 to send to a particular merchant device 104 based at least in part on information in the merchant profiles 124 and/or the buyer profiles 128. In some examples, the price determination module 132 may determine when to send the pricing information 604 to a particular merchant, such as in response to detecting a change in the customer base of the particular merchant, detecting a change in the cost of items sold by the particular merchant, or detecting a change in other factors that may affect the recommended price of an item offered by the particular merchant. Alternatively, the merchant may initiate a request for the pricing information 604, such as by sending a request from an associated merchant device.

In the example of FIG. 6, suppose that the price determination module 132 receives a pricing request 602 from a merchant device 104 (not shown in FIG. 6) associated with a first merchant. In this example, the request 602 includes item information 606 that may specify one or more items for which the first merchant would like to receive pricing information. The item information 606 may correspond to an item selected or otherwise identified by the first merchant, such as an item already offered by the first merchant, or an item that the first merchant is contemplating offering. For example, the first merchant may enter item information 606 into the merchant device 104, such as by manually entering information about the item. Alternatively, in some cases, the information about the item may have already been entered by the merchant and, to initiate the pricing request, the item may be merely selected by the merchant via a user interface, as discussed additionally below with respect to FIG. 7. As another alternative, information about the item may be obtained from a network location, such as from a website or other online source of information about the item. As another alternative, information about the item may be obtained by scanning a barcode associated with the item, and obtaining item information from an online database as a result of scanning the barcode. In some examples, the item information 606 may include descriptive information about the item, such as a size, color, flavor, or other descriptive information about the item, which depends at least in part upon the nature of the item.

In any of the examples above, the item information may be generalized or otherwise categorized to enable more effective determination of transactions for the same or similar items. For instance, some items may be described by item category, such as in the case that the items are generally fungible, e.g., a gallon of gasoline. On the other hand, for items that are not considered fungible, such as premium brands of goods, the prices compared may be for the same items of the same brand or of comparable brands.

Furthermore, the request 602 for pricing information may include first merchant information 608, which may include at least an identifier of the first merchant. For instance, the identifier may be any suitable type of identifier, such as an identifier assigned by the service provider, an identifier selected by or provided by the first merchant when signing up for the payment service, the name of the first merchant, an email address associated with the first merchant, an identifier associated with the merchant device of the first merchant, an identifier associated with an instance of the merchant application executing on the merchant device, a GPS location of the merchant device, or any other suitable identifier that can be used to match the request 602 with a first merchant profile 124(1) for the first merchant. Accordingly, the first merchant information 608 may be used to match the request 602 with the first merchant profile 124(1) from the plurality of merchant profiles 124.

In addition, in some examples the first merchant information 608 may further include additional information that may be taken into consideration when determining pricing for the one or more items offered by the first merchant. For instance, the first merchant information 608 may include merchant preference information 610 and/or merchant financial information 612. As mentioned above, in some examples, the first merchant may express a preference for catering to a particular type or category of buyer, such as buyers that share particular characteristics that can be identified in the respective buyer profiles 128. Further, as mentioned above, in some cases, the first merchant may desire to operate a high volume business or, in other cases, the first merchant may desire to operate a low-volume business that allows more personalized attention to individual customers.

Additionally, as mentioned above, in some examples the first merchant may want the pricing recommendations to be based at least in part on the first merchant's financial considerations, which may be set forth in the merchant financial information 612. As one example, the merchant may want the items to be priced such that the merchant might reasonably expect a particular profit margin on each item sold. As another example, the merchant may want the items to be priced such that the pricing is based at least in part on the merchant's cost for acquiring the items. Accordingly, the merchant financial information 612 may include information regarding the cost to the merchant for particular items offered by the first merchant. As one example, the first merchant may acquire raw material for a particular item from another one of the merchants 108 that uses the payment service of the service provider herein. Consequently, the price determination module 132 can determine from the merchant profile 124 of the other merchant if the cost of the raw material for the particular item offered by the first merchant has changed, and may take this change in cost into consideration when recommending a price to the first merchant for the particular item.

In addition, the first merchant profile 124(1) may include the first merchant item price information 130(1), as discussed above, which may include the current pricing that the first merchant has selected for each of the items offered by the first merchant, as well as item descriptions and/or other item information related to the items offered by the first merchant. For example, the pricing that the first merchant has selected for other items may provide an indication of the type of business model that the first merchant is implementing, which may be used when determining pricing. For instance, if most of the first merchant's items are priced over the median or average price, then this may be an indication that the first merchant is attempting to build a premium brand and therefore price recommendations for new items may be recommended to be more than the median or average price.

Further, the first merchant profile 124(1) may include the first merchant's transaction history 614, which may include a record of transactions conducted by the first merchant using one or more of the first merchant device(s) 104, as discussed above with respect to FIG. 1. For example, if the particular item for which the merchant is requesting pricing information has not sold as well at the first merchant as at other merchants who offer the item for a lower price, then the price determination module 132 may take this as an indication that the first merchant should lower the price for the particular item.

In response to receiving the request 602 for pricing information, the price determination module 132 may access the merchant profiles 124 to identify the first merchant profile 124(1). Further, the price determination module 132 may identify a subset 616 of merchant profiles corresponding to other merchants. For example, the merchant profiles in the subset 616 may be determined to be related to the request 602, such as by being associated with the same merchant category, the same location category, and or with a transaction for the same item. As one example, the subset 616 of merchant profiles may be selected based at least in part on the associated merchants having sold the particular item that is the subject of the price request 602. For example, suppose that the item is a 32-oz fountain drink. The price determination module 132 may search the transaction histories 614 in the merchant profiles 124 to find any transactions that included the sale of 32-oz fountain drinks, and the subset 616 may be determined at least in part on this basis.

However, merely determining the subset 616 based on the associated merchants having sold the same item may skew the pricing information. For example, suppose that the first merchant is a sandwich shop, while 32-oz fountain drinks are sold by a wide variety of merchants, including convenience stores, gas stations, food trucks, and so forth, with substantially different business models, costs, customers, different POS locations, and so forth. Accordingly, the subset 616 may be further narrowed to merchants that are similar to the first merchant, i.e., in a same merchant category as the first merchant and/or in a same location category as the first merchant.

For example, the price determination module 132 may access the first merchant profile 124(1) to determine information relevant to the first merchant, such as a merchant category, merchant location information, or various other types of merchant information, such as items offered for sale, hours of operation, and so forth. Further, as mentioned above, the MCC for a merchant, or other categorization techniques, may be used to categorize similar types of merchants into merchant categories. In some examples, the merchant categories used herein do not match the MCC categories, but may be more inclusive or less inclusive categories. Similarly, the merchants (and buyers) may be classified into location categories, e.g., based on POS location information 618, such as for particular categories of geographic regions, e.g., same street, same neighborhood, same postal code, same district of a city, same city, and so forth. Alternatively, of course, other location-based techniques may be used for determining merchants and/or buyers in the same geographic region or within proximity to one another, etc., such as distance from a reference location, or the like. Thus, the subset 616 of merchant profiles may be limited to other merchants in the same merchant category as the first merchant, and/or in the same location category as the first merchant, and/or otherwise determined to be similar to the first merchant. Further, in some examples, the item price information 130 of prices selected by the other merchants associated with the subset 616 may be taken into consideration when determining similarity of the other merchants to the first merchant, such as by comparing overall pricing strategies of the respective merchants.

In addition, in response to receiving the request 602 for pricing information, the price determination module may access the buyer profiles 128 to identify a subset 620 of buyer profiles having transaction histories 622 that include one or more transactions for the particular item. Further, the subset 620 may be narrowed to transactions that were conducted with the first merchant or the merchants corresponding to the subset 616 of merchant profiles, i.e., transactions for the particular item that were conducted with the first merchant or merchants similar to the first merchant. Typically, many of the buyer profiles in the subset 620 may include buyer characteristics 624, which may include demographic information that has been gathered about each buyer, shopping habits and preferences of each buyer, and so forth. Accordingly, the buyer characteristics 624 may be used to enable the first merchant to specify a category of buyer to which the first merchant would like to target his or her business, and determine appropriate pricing for various items based on that goal. Thus, in some cases, the subset 620 of buyer profiles may be further narrowed to buyer profiles that share one or more specified buyer characteristics 624.

The information included in the first merchant profile 124(1), the subset 616 of merchant profiles and/or the subset 620 of buyer profiles may be provided to, or accessed by, price recommendation logic 626 that may use this information when determining pricing information 604 for the first merchant. For example, the price recommendation logic 626 may be one or more algorithms, computational models, or the like, configured to determine a price to recommend to the first merchant, along with the other pricing information, such as high price, low price, median price, average price, etc., of the particular item among similar merchants.

As one example, the price recommendation logic 626 may determine a recommended price for the particular item based on the transaction histories 614 in the subset 616 of merchant profiles of merchants that are similar to the first merchant, e.g., such as by being classified in the same merchant category. Further, in some examples, the subset 616 of merchant profiles may be limited to merchants that are classified in a same geographic category as the first merchant, e.g., same neighborhood, zip code, city, etc. Thus, the price recommendation logic 626 may determine the prices of the particular item at various merchants corresponding to the subset 616, may determine how many items have been sold at various prices over one or more periods of time, e.g., over the past week, over the past month, over the past two months, over the past year, etc., and may be able to project how many units of the particular item the first merchant may be able to sell at various different price points. In some examples, if the first merchant has already been in business for a while, the overall sales volume of the first merchant for a plurality of items (i.e., total number of transactions per week, month, etc.) may be compared with the overall sales volume of the similar merchants over a similar period of time, which can improve the accuracy of the projected sales volume of the particular item by the first merchant at the various price points. For example, if similar merchants conduct an average of 3000 transactions per week, with 300 of those transactions including 32-oz fountain drinks at a particular price, and the first merchant conducts 1500 transactions per week, then the sales projection for the first merchant to sell 32-oz fountain drinks at the particular price may be 150 transactions, i.e., based at least in part on a ratio of total transactions conducted over a selected period of time. Of course, additional factors may be considered when making sales predictions, with the foregoing being merely one example for discussion purposes.

As another example, the price determination module 132 may determine the subset 620 of buyer profiles from the plurality of buyer profiles 128 as discussed above, e.g., based on the associated buyers having purchased the particular item at least once from the first merchant or from similar merchants. Further, suppose that the first merchant wants to focus his or her business on catering to customers in the 40-60 year age range. Accordingly, the subset of buyer profiles may be further limited based on the buyer characteristics 624 to those buyer profiles that meet the specified criteria. These characteristics 624 may include demographic characteristics and/or item purchase characteristics such as: buyer residence information; buyer age; buyer sex; buyer affluence; buyer ethnicity; buyer language; buyer education; buyer marital status; buyer occupation; buyer religion; buyer political affiliation; buyer memberships in associations, and so forth. Additionally or alternatively, these characteristics 624 may include various behavioral characteristics including, for example, geographic locations where the buyers shop, the categories of merchants at which the buyers shop, the items purchased by the buyers, the time of day the buyers shop, the average amount spent by the buyers in certain merchant categories, and so forth. Thus, the price recommendation logic 626 may further take into consideration other transaction information in the transactions histories 614 and 622, such as time of day and days of the week during which items were purchased. For example, if the first merchant does not open for business until 4:00 pm, transactions that took place during morning hours may not be considered when determining pricing recommendations for the first merchant in some cases.

Figure 7:
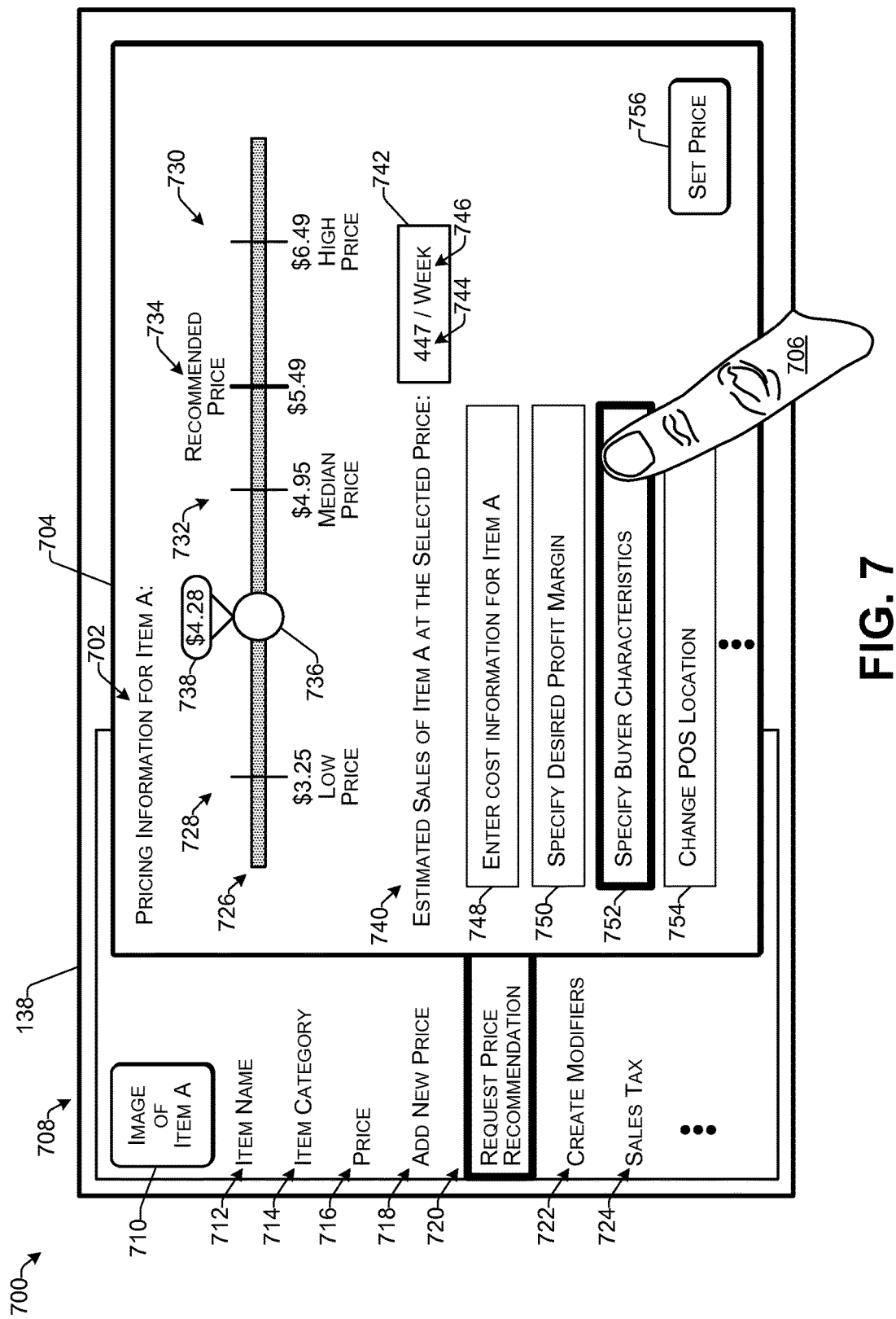
FIG. 7 illustrates an example interface for presenting pricing information to a merchant according to some implementations.

FIG. 7 illustrates an example graphical user interface (UI) 700 for presenting pricing information to a merchant according to some implementations. For example, pricing information 702 may be presented in a window 704 or other area of the display 138 associated with the merchant device 104 (not shown in FIG. 7). Alternatively, of course, the pricing information 702 may be presented to the merchant using any other suitable communication technology or presentation techniques, such as audio presentation, presentation at a designated area of the UI 700, presentation on a separate display, and so forth. In some examples, the UI 700 may be optimized to receive touch inputs from a finger or other input object 706.

In the example of FIG. 7, the pricing information 702 is shown as being presented in the window 704, such as a popup window, that may be closed by the merchant after viewing, or that may close automatically after the elapse of a predetermined period of time. Additionally, in other examples, the pricing information 702 may be presented in any other suitable type of window or other interface, or using any suitable type of graphic, overlaid text, or the like. For instance, the pricing information 702 may be presented over another interface or in its own designated area of an interface already presented, and may be presented by the merchant application, or by a separate application that is executable on the merchant device or on any other suitable computing device.

As one example, the window 704 may be presented as an overlay on an item setup interface 708 provided by the merchant application. For example, the item setup interface 708 may be used by the merchant for adding or updating item information such as payment processing information for particular items that are offered, or that will be offered, by the merchant. In the illustrated example, the item setup interface 708 may enable the merchant to add an image 710 that is representative of the particular item for which the merchant is setting up the item information, and which is referred to as item A in this example. For example, at a later time, when the merchant is conducting transactions with buyers, the image 710 may be presented on the merchant device, along with a plurality of images of other items offered by the merchant. The merchant may select a particular item that is being purchased by a buyer, such as by tapping on a corresponding image of the item, or the like.

The item setup interface 708 may further include an item name 712, an item category 714, a current item price 716, an option 718 to add a new price 718 manually, an option 720 to request a price recommendation, an option 722 to create modifiers for the item (e.g., optional choices for the item, such as type of bread or toppings for a sandwich, etc.), and a sales tax amount 724 to be charged when the item is purchased. Accordingly, the merchant may use the item setup interface 708 to enter information about an item that the merchant offers or intends to offer to buyers.

In this example, suppose that during use of the item setup interface 708, such as for adding item A to the merchant's current offerings, or during adjustment of pricing for item A if item A is already offered by the merchant, the merchant selects the option 720 to request price recommendations to determine pricing for item A. Accordingly, the option 720 may be highlighted, as illustrated. Further, in response, to receiving the user input via the interface 708, the merchant device may send to the service computing device a request for pricing information, as discussed above with respect to FIG. 6. In response, the service computing device may send to the merchant device the requested pricing information, as also discussed above. The merchant device may receive the pricing information and the merchant application may present the pricing information in the window 704 such as overlaid on the item setup interface 708.

The window 704 may include one or more graphic elements, and may be interactive for enabling the merchant to interact with the pricing information 702 for item A. Accordingly, the window 704 may present a UI that includes a graphic element 726, which is illustrated as a slider scale in this example, but which may be any interactive control to enable the merchant to view various different price points for item A. In this example, the pricing information 702 for item A includes a low price 728, a high price 738, a median price 732, and a recommended price 734. For example, the low price 728 may be the lowest price offered by a similar merchant in the same geographic region as the current merchant. Similarly, the high price 730 may be the highest price offered by a similar merchant in the same geographic region as the current merchant. Furthermore, the median price 732 may be the median price among all similar merchants in the same geographic region as the first merchant (e.g., as determined from a subset of merchant profiles of merchants categorized in the same category as the current merchant and categorized in the same geographic region as the current merchant, as discussed above with respect to FIG. 6). In addition, the recommended price 734 may be the price for item A that is recommended for the current merchant. In some examples, the recommended price 734 may be determined based upon one or more of the various factors discussed above with respect to FIG. 6, such as an expressed or implied business model of the current merchant, a specified profit margin, specified customer characteristics, or the like.

In this example, the graphic element 726 further includes a virtual slider element 736 that the merchant may slide along the graphic element 726 to view various different price points. For instance, the different prices may be presented above the slider element 736, as indicated at 738, at any other suitable location, or using any other suitable technique. In addition, the window 704 may include an indication 740 of projected sales volume of item A at a selected price. For example, a box 742 may present a number of units 744 projected to be sold over a selected period of time 746 at a selected price point. Accordingly, as the merchant slides the slider element 736 along the slider scale of the graphic element 726, the predicted sales of item A indicated at 744 may change to reflect the various predicted sales at the various different possible price points for the particular merchant. For example, as the merchant slides the slider element 736 toward the low price point, the predicted sales number 744 of item A may increase based on calculations previously made by the service computing device, or based on calculations made in near real time by the service computing device. In some examples, the predicted sales number 744 may be calculated as discussed above with respect to FIG. 6. Accordingly, if the merchant is interested in selecting price points other than the recommended price 734, the merchant may be presented with estimates of how many units the merchant might be able to sell at other selected price points. Further, while sales volume over time is presented as a metric in this example, numerous other metrics tied to price changes may be presented in other examples, and may, in some cases, be presented based on expressed preferences of the particular merchant.

In the illustrated example, suppose that item A is a large flavored latte drink. Thus, the presented pricing information for item A shows that the lowest price at which the large flavored lattes are offered by similar merchants in the current merchant's geographic region is $3.25, while the highest price is $6.49. Further, the median price is $4.95. Further, suppose that the merchant has previously indicated, either expressly to the service provider, or implicitly through pricing of other items offered by the merchant, that the merchant desires to operate a premium brand business model and charge premium prices. Accordingly, the service provider may determine that $5.49 is the optimal recommended price for the merchant based on the number of projected sales per week, e.g., estimated at 395 sales per week (not shown in FIG. 7). However, suppose that the merchant is considering changing business models to a higher volume business model. Thus, the merchant may slide the slider element 736 along the slider scale to various different price points to see how many more units the merchant might be able to sell at the different price points. In this example, the merchant has moved the slider element to the $4.28 price point, and the estimated sales for item A has changed accordingly to 447 units per week.

If the merchant decides to proceed with changing the current business model, or if the merchant otherwise desires to change one or more factors currently applied for determining the recommended price for the merchant, in some examples, the merchant may use one or more controls presented in the window 704 for accomplishing this. Thus, the UI 700 may include virtual controls 748-754 to enable the merchant to adjust various factors that are used for calculating the recommended price 734 for item A. As several examples, the merchant may be able to select a virtual control 748 for entering cost information for item A, which the service computing device may take into account when considering a recommended price 734. In addition, the merchant may be able to select a virtual control 750 to specify a desired profit margin for item A, such as when the merchant desires that the recommended price 734 to take into account a specific profit margin per unit sold for item A. In addition, the merchant may be able to select a virtual control 752 to specify buyer characteristics, such as for pricing item A to cater to a particular clientele or other buyer category, which may be determined through one or more buyer characteristics included in the buyer profiles 128. In addition, the merchant may be able to select a virtual control 754 to change a POS location to determine if different prices may be charged at a different location. For example, if the merchant has a mobile business such as in the case of a street vendor, food truck, or the like, the merchant may want to determine if there are better locations for conducting transactions. Further, other constraints and considerations will be apparent, with those illustrated herein merely being several examples for discussion purposes.

When the merchant has decided on a price for item A, the merchant may select a virtual control 756 to set the selected price as the price for item A. The selection of control 756 may result in the selected price being entered into the item setup interface 708 as the new current price 716, and the window 704 may close. Subsequently, the merchant may complete the setup for item A, and the selected price is added to the item price information for use by the merchant application when conducting transactions with buyers. Furthermore, the updated item price information may be sent by the merchant application to the service computing device, as discussed above, and associated with the merchant profile of the particular merchant. Additionally, if the merchant has multiple merchant devices, the updated item price information may be sent by the service computing device to the other merchant devices associated with the merchant profile of the particular merchant. As another alternative, the merchant devices of the merchant may be able to communicate item price information to each other directly.

In addition, as another example, the merchant may be able to view a plurality of the graphic elements 726 concurrently for a respective plurality of items offered by the merchant. For example, the multiple graphic elements 726 may be vertically aligned along the median (or average) price points 732 so that the merchant may view which items are priced above the median price point 732, which items are priced below the median price point 732, and so forth. The merchant may adjust any of the prices, such as using the respective slider element 736 for a respective item, and upon completion, the price adjustments may be automatically entered by the merchant application for use when conducting transactions.

Additionally, while several examples of interfaces for presenting pricing information have been described above, the pricing information may alternatively be presented in any other suitable manner using any suitable interfaces, with the foregoing being merely several examples provided for descriptive purposes. Numerous other variations will be apparent to those of skill in the art having the benefit of the disclosure herein.

Figure 8:
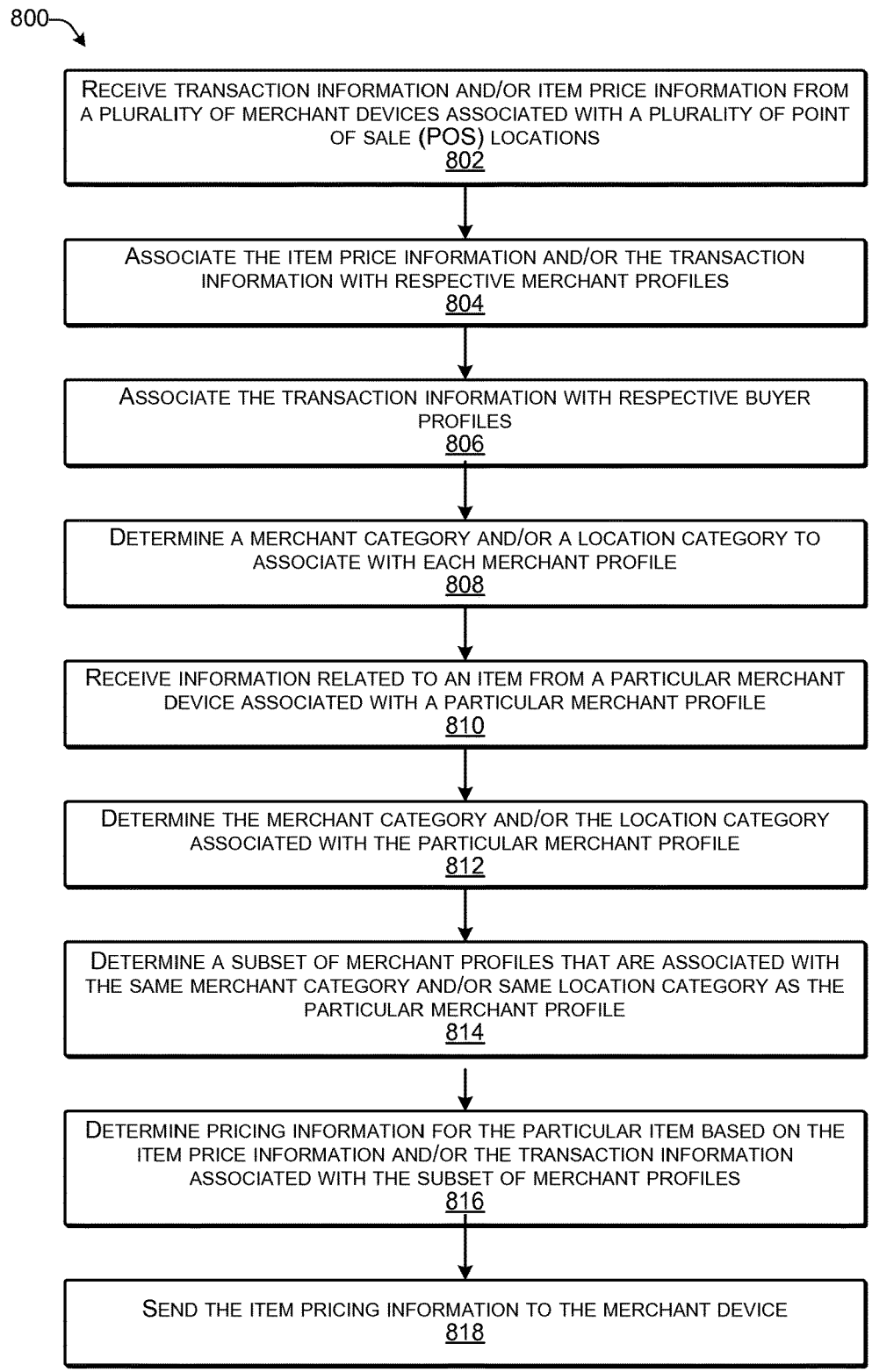
FIG. 8 is a flow diagram illustrating an example process for providing pricing information to a merchant according to some implementations.

FIG. 8 is a flow diagram illustrating an example process 800 for providing pricing information to merchants according to some implementations. In some examples, the process may be executed by the service computing device 102, or by one or more other suitable computing devices.

At 802, the computing device receives at least one of item price information or transaction information from a plurality of merchant devices associated with a plurality of different POS locations and a plurality of different merchants. For example, as discussed above, the service computing device may receive item price information and/or transaction information from a plurality of different merchant devices associated with a plurality of different merchants. For instance, the transaction information may be for a plurality of POS transactions conducted between a plurality of buyers and the plurality of merchants. The item price information may be price information that the respective merchant has selected for particular items offered by the merchant, and may be communicated to the service provider by the merchant application, e.g., upon selection of a particular price for a particular item, or in response to a merchant-initiated change in the price.

At 804, the computing device may associate the item price information and/or the transaction information with respective merchant profiles. For example, each merchant profile may include a list of items currently offered by the merchant, and may further include a transaction history of some or all transactions conducted with various buyers by the merchant using the merchant device.

At 806, the computing device may further associate the transaction information with respective buyer profiles. As discussed above with respect to FIGS. 3-5, in some examples, a probabilistic model or other suitable techniques may be used for associating the transaction information with respective buyer profiles.

At 808, the computing device may determine at least one merchant category and/or at least one location category to associate with each of the merchant profiles. For example, the merchant categories may be based at least in part on the items or categories of items that merchants sell. In some cases, the merchant categories may correspond to MCCs, may be similar to MCCs, and/or may be more inclusive or less inclusive than MCCs. Additionally, the location categories may be determined based on the location(s) at which the respective merchant conducts POS transactions, such as may be determined from GPS information, the address of the merchant, network access points, cell towers, and so forth. For instance, a merchant may be categorized into several different location categories, such as a particular street, particular neighborhood, particular district, particular city, etc. In addition, the location categories need not all necessarily relate to the same geographic region. For example, an airport bar in San Francisco and an airport bar in Washington D.C. might be associated with the same location category, i.e., being located in an airport. Thus, the location categories may include categories for defined physical areas, such as airports, malls, stadiums, farmer's markets, and so forth.

At 810, the computing device may receive information related to an item from a particular merchant device. As one example, the merchant may send a request for pricing information for a particular item already offered by the merchant, or that the merchant is considering offering to buyers. As another example, the information related to the particular item may be received in response to the merchant configuring the merchant application to enable processing of transactions for the particular item. For instance, the information related to the item may be received with the item price information discussed above.

At 812, the computing device may determine the merchant category and/or the location category associated with the particular merchant profile. For example, the merchant category may be determined as discussed above. In addition, in some cases, the merchant may specify a location category, while in other cases, the computing device may determine an appropriate location category, such as based at least in part on the merchant category of the merchant, the size of the city or other location in which the merchant does business, whether the merchant does business at a fixed POS, a mobile POS, and so forth. For instance if the merchant is located in a large city, the location category may initially be limited to a neighborhood or district of the city in some examples, which may also depend in part on the merchant category of the merchant, i.e., how many other merchants in the same merchant category do business in the location corresponding to the selected location category. For example, if the selected location category limits the number of other merchants to only several, a different location category may be selected so that a larger number of merchants are included and, thus, the pricing information might be more accurate or representative.

At 814, the computing device may determine a subset of merchant profiles that are associated with the same merchant category and/or the same location category as the first merchant. As mentioned above, the location category may be selected to provide a sufficiently large number of merchants in the subset to provide a representative sample of pricing for particular items. For instance, in some examples, merchant categories may not be used, since, for some types of items, any merchant selling a particular item may be at least somewhat similar to other merchants that sell that item. Additionally, in some examples, location categories might not be used, such as in the case of relatively uncommon business, e.g., of which there may only be a limited number world-wide, nation-wide, or the like.

At 816, the computing device may determine pricing information for the particular item based on the item price information and/or the transaction information associated with the subset of merchant profiles. For instance, the determined pricing information may include a price recommendation, for the particular item, that is personalized for the particular merchant. In some examples, the computing device may take into consideration one or more factors, such as an expressed or implied intention of the merchant to operate a particular business model, e.g., high volume, high-quality service, etc., as discussed above. Further, in some cases, the price recommendation may be based at least in part on financial information provided by the merchant, such as a cost of the particular item to the merchant, a desired profit margin per unit sold, and so forth. Additionally, in some examples, the pricing recommendation may be based at least in part on one or more buyer characteristics desired by the merchant. Accordingly, in such a case, a subset of buyer profiles may be determined, and transactions for the particular item conducted by the associated buyers may be analyzed to determine a recommended pricing of the item that is appropriate for the buyers that share the one or more characteristics.

At 818, the computing device may send a communication including the pricing information to the merchant device of the particular merchant. The merchant device may present the pricing information, including a price recommended for the particular merchant, on a display of the merchant device, and the merchant may determine whether not to select the recommended price or a different price based on the pricing information. As mentioned above, the pricing information may be presented in an interactive graphic UI in some examples, such as to enable the merchant to view the effect of various different prices on sales volume or other metrics.

Figure 9:
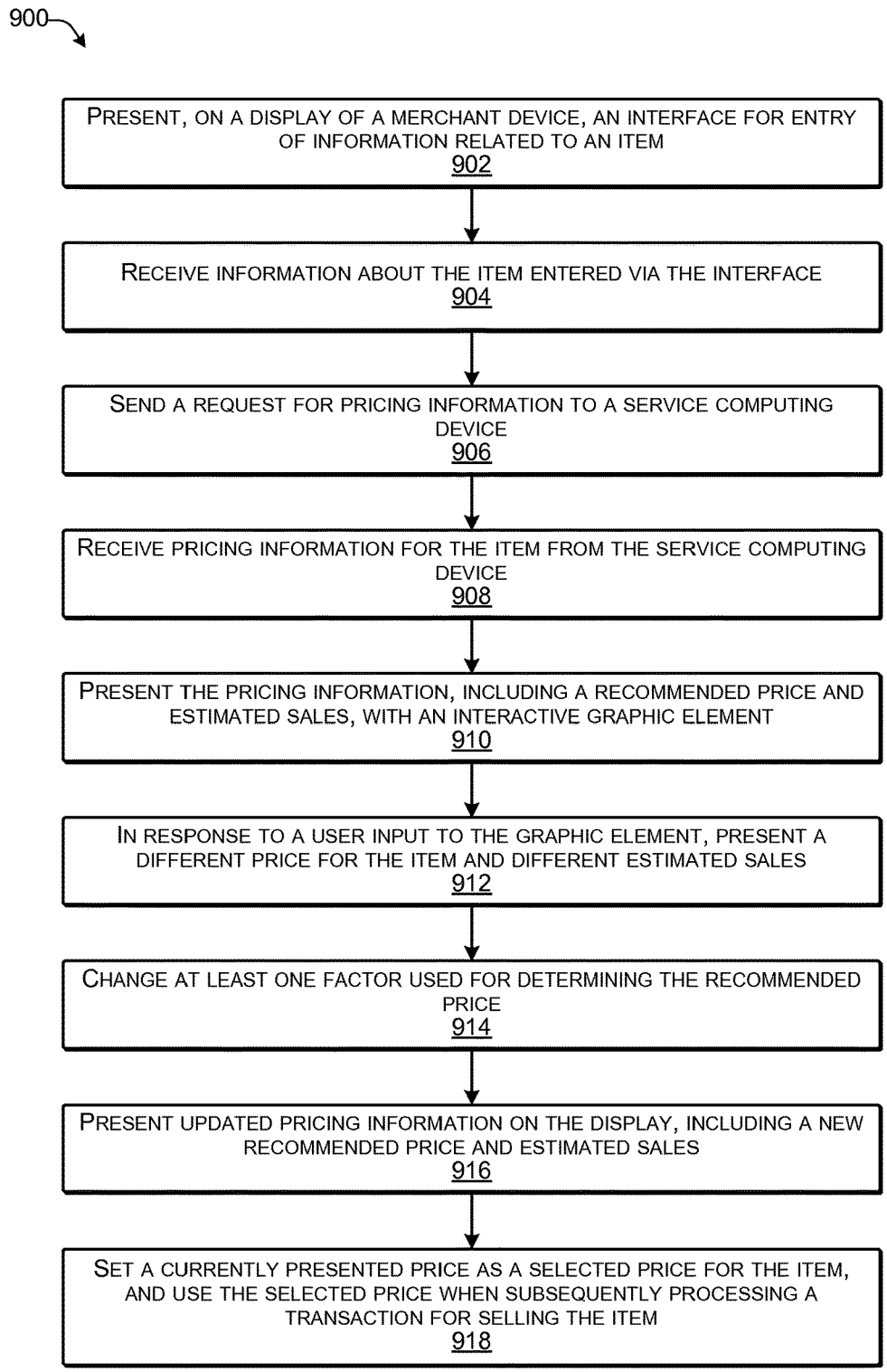
FIG. 9 is a flow diagram illustrating an example process for providing pricing information to a merchant according to some implementations.

FIG. 9 is a flow diagram illustrating an example process 900 for providing pricing information to merchants according to some implementations. In some examples, the process may be executed by the merchant device or by another suitable computing device.

At 902, the merchant device may present, on a display associated with the merchant device, an interface for entry of information related to an item. For example, the merchant device may present an item setup interface or other suitable interface able to receive and/or present information about an item offered by the merchant or contemplated to be offered by the merchant.

At 904, the merchant device may receive information about the item entered via the interface. For example, any of the techniques discussed above may be used for entering and/or obtaining information about the item. For instance, the merchant may enter at least a name of the item and other relevant information, such as a size, color, flavor, style, and so forth. Further, in some examples, the merchant may add an image representative of the item using the interface.

At 906, the merchant device may send a request for pricing information to a service computing device. For example, the merchant may select an option to have a recommended price for the item provided to the merchant.

At 908, the merchant device may receive pricing information for the item from the service computing device. For example, the pricing information may include at least a recommended price that is personalized for the merchant based on one or more factors relevant to the merchant.

At 910, the merchant device may present the pricing information on the display. For example, the pricing information, including a recommended price and estimated sales, may be presented with at least one interactive graphic element, such as a slider, dial, and so forth, as discussed above. Additionally, in some examples, the pricing information, at least one of a highest price at which the item is offered by other merchants, a lowest price at which the item is offered by other merchants; a median price at which the item is offered by other merchants, or an average price at which the item is offered by other merchants. Alternatively, in some examples, the price recommendation may merely be presented as a text-based recommendation, without an interactive graphic element. For example, the text-based recommendation may be overlaid on or inserted into the item setup user interface discussed above, or may be presented using any other suitable techniques for conveying the pricing information to the merchant.

At 912, in response to a user input to the graphic element, the merchant device may present a different price for the item and a different estimated sales projection. For instance, as the user slides a slider element, the different price points and associated different sales estimates may be presented on the display.

At 914, in response to a user input, the merchant device may send, to the service computing device, a change received to at least one factor used for determining the recommended price. For instance, the merchant may change various factors that may affect the recommended price, such as a cost of the item paid by the merchant, a specified profit margin desired by the merchant, at least one specified buyer characteristic used for focusing on a desired clientele, or an expressed or implied business model associated with the merchant.

At 916, the merchant device may present updated pricing information on the display, including a new recommended price and estimated sales, in response to the change in the at least one factor.

At 918, in response to a user input, the merchant device may set a currently presented price as a selected price for the item. Further, the merchant device may use the selected price when subsequently processing a transaction for selling the item. For example, the selected price may be applied when the merchant selects an image representative of the item from among a plurality of item images presented on the display while conducting a transaction with a buyer who is purchasing the item.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 10:
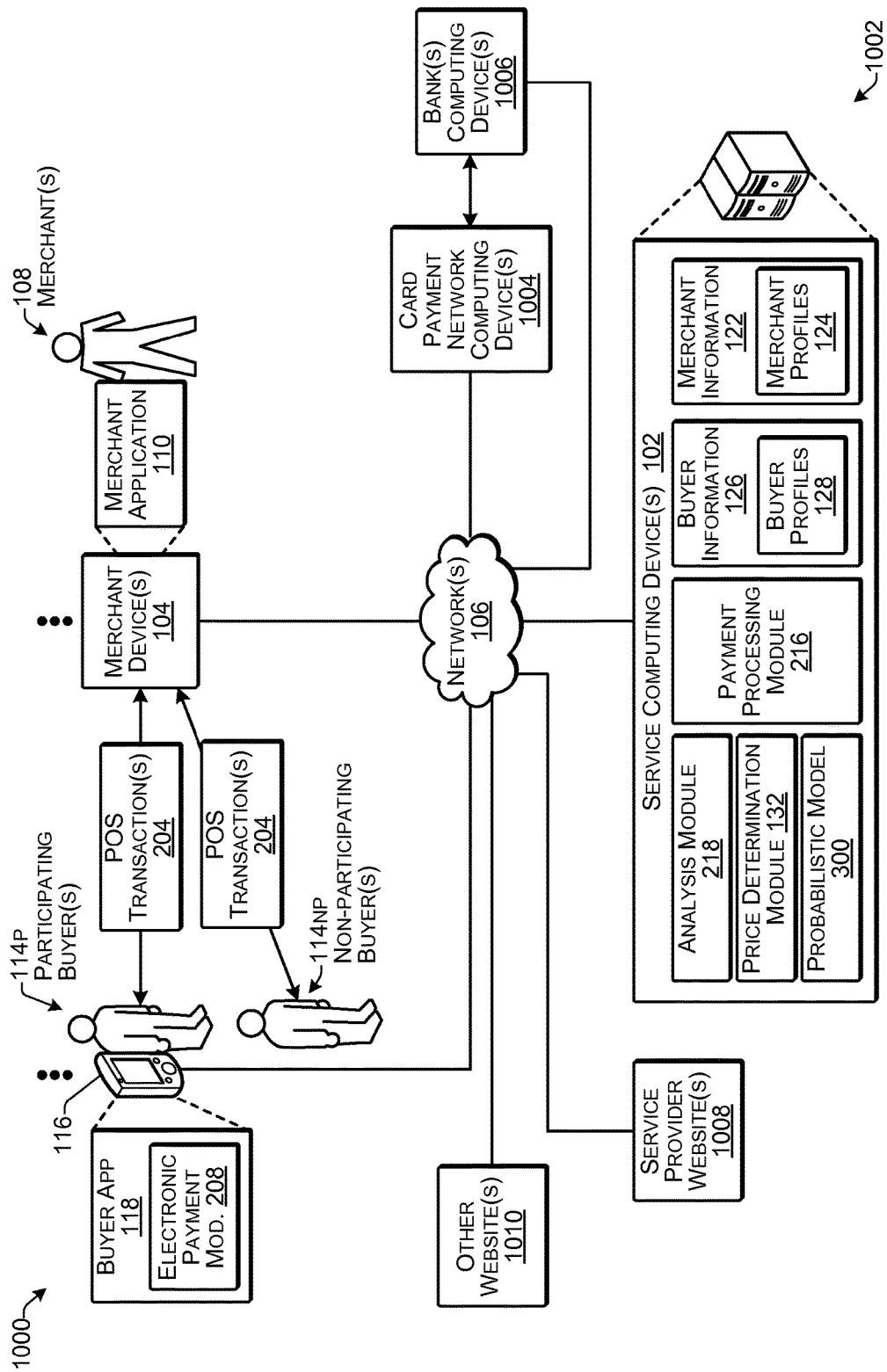
FIG. 10 illustrates an example architecture of a system for providing a payment service and a pricing information service according to some implementations.

FIG. 10 illustrates an example architecture of a payment and pricing information system 1000 able to provide a payment and pricing information service according to some implementations. In the example of FIG. 10, the service computing device 102 of a service provider 1002 includes the payment processing module 216, which may be executed to provide the payment and transaction functionality, as described herein. The payment processing module 216 and corresponding payment functionality may be implemented as one or more computer programs, or other executable instructions, on the service computing device 102 in one or more locations, such as for providing the payment systems, components, and techniques described herein.

The example of FIG. 10 illustrates at least one buyer device 116 and at least one merchant device 104. For example, each buyer device 116 may be associated with a participating buyer 114p that participates in the payment system of the service provider 1002. The buyer device 116 may include the buyer application 118, as previously discussed herein, which may include an electronic payment module 208 that provides functionality for enabling the buyer 114p to make electronic payments using the buyer device 116. In some examples, the buyer application 118 may include various other applications or modules, such as for a buyer dashboard to enable the buyer to control information in the buyer's profile, set buyer preferences, and so forth. Further, the merchant device 104 may be associated with a merchant 108 that participates in the payment service provided by the service provider 1002, and the merchant device 104 may include the merchant application 110. As discussed elsewhere herein, the buyer device 116 and the merchant device 104 can each be a computing device able to communicate with each other, with the service computing device 102, and with various other computing devices, through any suitable communication protocols, interfaces, and networks, including the one or more communication networks 106.

The buyer device 116 and the merchant device 104 can each include one or more components, e.g., software or hardware, that are configured to respectively determine a geographic location of the buyer device 116 and/or the merchant device 104, using, for example, various geolocation techniques, e.g., a global positioning system (GPS), cell tower location, wireless access point location, wireless beacon location, and so forth. Further, the buyer device 116 and the merchant device 104 can each be any appropriate device operable to send and receive requests, messages, or other types of information over the one or more networks 106 or directly to each other. Some examples of buyer devices 116 and merchant devices 104 are enumerated below. Additionally, while only a single buyer device 116 and a single merchant device 104 are illustrated in the example of FIG. 10, in some implementation, there may be thousands, hundreds of thousands, or more, of the buyer devices 116 and the merchant devices 104, depending on the number of the participating buyers 114p and the number of merchants 108.

The one or more networks 106 can include any appropriate network, including a wide area network, such as the Internet; a local area network, such an intranet; a wireless network, such as a cellular network, a local wireless network, such as Wi-Fi and/or close-range wireless communications, such as Bluetooth® and Bluetooth® low energy; a wired network; or any other such network, or any combination thereof. Accordingly, the one or more networks 106 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Accordingly, the service computing device 102, the merchant devices 104, the buyer devices 116, and the other computing devices discussed herein are able to communicate over the one or more networks 106 using wired or wireless connections, and combinations thereof.

Additionally, in some examples, information may also be obtained with respect to non-participating buyers 114np that do not have an account with the payment service provided through the service computing device 102. The transaction information collected with respect to these buyers may be sent to the service computing device 102, and buyer profiles may be created for the nonparticipating buyers 114np, as discussed above. Should one or more of the non-participating buyers later become a participating buyer, such as by signing up for the electronic payment service, the transaction information of an existing buyer profile for that buyer may be merged with the newly created profile using the information matching and probabilistic modeling techniques described above with respect to FIGS. 3-5. In addition, in some examples, transaction information may be obtained with respect to non-participating merchants (not shown) that do not use a merchant device 104, and this transaction information may be employed when determining the pricing information for the merchants 108.

When paying for a transaction, the buyer 114 can provide the amount of payment that is due to the merchant 108 using cash, check, a payment card, or by electronic payment using the buyer application 118 on the buyer device 116. The merchant 108 can interact with the merchant device 104 to process the transaction. During POS transactions 204, the merchant device 104 can determine and send data describing the transactions, including, for example, the item(s) being purchased, the amount of the item(s), buyer information, and so forth. In some implementations, the payment and pricing information service enables card-less payments, i.e., electronic payments, for transactions between the participating buyers 114p and the merchants 108 based on interaction of the buyer 114p with the buyer application 118 and interaction of the merchant 108 with the merchant application 110. Accordingly, in some examples, a card-less payment transaction may include a transaction conducted between a participating buyer 114p and a merchant 108 at a POS location during which an electronic payment account of the buyer 114p is charged without the buyer 114p having to physically present a payment card to the merchant 108 at the POS location. Consequently, the merchant 108 need not receive any details about the financial account of the buyer 114p for the transaction to be processed. As one example, the electronic payment may be charged to a credit card issuer or credit card number that the participating buyer 114p provided when signing up with the service provider for the electronic payment account. As another example, the buyer 114p may have a quantity of money pre-paid in an account maintained for use in making the electronic payments. Other variations will also be apparent to those of skill in the art having the benefit of the disclosure herein.

Before conducting an electronic payment transaction, the participating buyer 114p typically creates a user account with service provider of the payment and pricing information service. The participating buyer 114p can create the user account, for example, by interacting with the buyer application 118 that is configured to perform electronic payment transactions and that may execute on the buyer device 116. When creating a buyer electronic payment account with the payment service, the participating buyer 114p may provide an image including the face of the buyer, data describing a financial account of the buyer 114p, e.g., a credit card number, expiration date, and a billing address. This user information can be securely stored by the payment service, for example, in the buyer information 126, such as in a secure database. Further, the buyer profiles 128 may be created for each buyer 114, which may include information about the buyer and transactions conducted by the buyer.

To accept electronic payments for POS transactions, the merchant 108 typically creates a merchant account with the payment and pricing information service by providing information describing the merchant including, for example, a merchant name, contact information, e.g., telephone numbers, the merchant's geographic location address, and one or more financial accounts to which funds collected from buyers will be deposited. This merchant information can be securely stored by the payment service, for example, in the merchant information 122, such as in a secure database. Further, a merchant profile 124 may be created for each merchant, which may include information about the merchant and transactions conducted by the merchant.

The payment service is configured to enable electronic payments for transactions. The payment service can include one or more servers that are configured to perform securely electronic financial transactions, e.g., electronic payments for transactions between a buyer and a merchant, for example, through data communicated between the buyer device 116 and the merchant device 104. Generally, when a buyer and a merchant enter into an electronic payment transaction, the transaction is processed by electronically transferring funds from a financial account associated with the user account to a financial account associated with the merchant account.

The payment and pricing information service is configured to send and receive data to and from the buyer device 116 and the merchant device 104. For example, the payment and pricing information service can be configured to send information describing merchants to the buyer application 118 on the buyer device 116 using, for example, the information stored in the merchant information 122. For example, the payment and pricing information service can communicate data describing merchants 108 that are within a threshold geographic distance from a geographic location of the buyer device 116. The data describing the merchants 108 can include, for example, a merchant name, geographic location, contact information, and an electronic catalogue, e.g., a menu that describes items that are available for purchase from the merchant.

In some embodiments, the payment and pricing information service is configured to determine whether a geographic location of the buyer device 116 is within a threshold geographic distance from a geographic location of the merchant device 104. The payment and pricing information service can determine a geographic location of the buyer device 116 using, for example, geolocation data provided by the buyer device 116. Similarly, the payment and pricing information service can determine a geographic location of the merchant device 104 using, for example, geolocation data provided by the merchant device 104 or using a geographic address, e.g., street address, provided by the merchant. Depending on the implementation, the threshold geographic distance can be specified by the payment and pricing information service, by the buyer, or by the merchant.

Determining whether the buyer device 116 is within a threshold geographic distance of the merchant device 104 can be accomplished in different ways including, for example, determining whether the buyer device 116 is within a threshold geographic radius of the merchant device 104, determining whether the buyer device 116 is within a particular geofence, or determining whether the buyer device 116 can communicate with the merchant device 104 using a specified wireless technology, e.g., Bluetooth® or Bluetooth® low energy (BLE). In some embodiments, the payment and pricing information service restricts electronic payment transactions between the participating buyer 114p and the merchant 108 to situations where the geographic location of the buyer device 116 is within a threshold geographic distance from a geographic location of the merchant device 104.

The payment and pricing information service can also be configured to communicate with one or more computing devices 1004 of a card payment network (e.g., Master-Card®, VISA®) over the one or more networks 106 to conduct financial transactions electronically. The payment and pricing information service can also communicate with one or more bank computing devices 1006 of one or more banks over the one or more networks 106. For example, the payment and pricing information service may communicate with an acquiring bank, and/or an issuing bank, and/or a bank maintaining buyer accounts for electronic payments.

An acquiring bank may be a registered member of a card association (e.g., Visa®, MasterCard®), and may be part of a card payment network. An issuing bank may issue payment cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the buyer may use a debit card instead of a credit card, in which case, the bank computing device(s) of a bank corresponding to the debit card may receive communications regarding a transaction in which the buyer is participating. Additionally, there may be computing devices of other financial institutions involved in some types of transactions or in alternative system architectures, and thus, the foregoing are merely several examples for discussion purposes.

The participating buyer 114p operating the buyer device 116 that is within a threshold geographic distance of the merchant device 104 can interact with the buyer application 118 executed on the buyer device 116 to conduct an electronic payment transaction with the merchant 108. While interacting with the buyer application 118, the buyer 114p can select the merchant 108, from a listing of merchants 108, with whom the buyer 114p wants to enter into an electronic payment transaction. The buyer 114p can select the merchant 108, for example, by selecting a "check in" option associated with the merchant 108. The buyer device 116 can communicate data to the payment and pricing information service indicating that the buyer 114p has checked in with the merchant 108. In response, the payment and pricing information service can communicate data to notify the merchant device 104 that the buyer has checked in. The merchant application 110 executing on the merchant device 104 can notify the merchant 108 that the buyer has electronically checked in with the merchant 108 through a display screen of the merchant device 104.

Once checked in, the buyer 114p can obtain, or request, items that are available to be acquired from the merchant 108. When the buyer 114p is ready to enter into the card-less payment transaction, the buyer 114p can, for example, approach a point of sale for the merchant 108 and identify him or herself. For example, the buyer 114p can verbally notify the merchant 108 that the buyer 114p wants to enter into a card-less payment transaction and can provide the merchant 108 with the buyer's name. The merchant 108 can then interact with the merchant application 110 to select the buyer 114p, from a listing of buyers that have checked in with the merchant 108, to initiate an electronic payment transaction for the item(s) being acquired by the buyer 114p. For example, the merchant 108 can determine a total amount to charge the buyer 114p for the item(s) being acquired. The buyer 114p can verbally approve the total amount to be paid and, in response, the merchant 108 can submit a request for an electronic payment transaction for the total amount of the transaction to the payment and pricing information service. In response, the payment and pricing information service can obtain, for example, from the buyer information 126, data describing a financial account associated with the electronic purchase account of the buyer 114p to which the total amount will be charged.

The payment and pricing information service can then communicate with the computing device 1004 of a card payment network to complete an electronic payment transaction for the total amount to be charged to the buyer's electronic payment account. Once the electronic payment transaction is complete, the payment and pricing information service can communicate data describing the electronic payment for the transaction to the buyer device 116, e.g., as an electronic receipt, which can, for example, notify the buyer 114p of the total amount charged to the buyer for the electronic payment for the transaction with the particular merchant. Further, while a mobile buyer device 116 is described in this example for purposes of explanation, additional or alternative types of devices may be used in other examples.

In addition, in some examples, the service provider 1002 may make available one or more service provider websites 1018 that enable merchants 108 to advertise items on the service provider website(s). For example, merchants 108 may offer items for purchase to buyers on the website. The buyers may purchase the items using a web browser, or other application on a computing device, such as the buyer device 116 or other computing device. The transaction information from these transactions may be provided to the service computing device 102 to add further to the transaction information in the buyer profiles 128 and the merchant profiles 124.

In addition, the analysis module 218 and/or the price determination module 132 may access other websites 1010 when determining information about buyers and/or when determining price recommendations for merchants, respectively. For example, demographic information and other buyer information may be obtained from the US Census Bureau website, social network sites, a microblog site, or other online presences of the various different buyers. Similarly, geographic information may be obtained from websites that provide maps and other geographic or demographic information, or the like.

Figure 11:
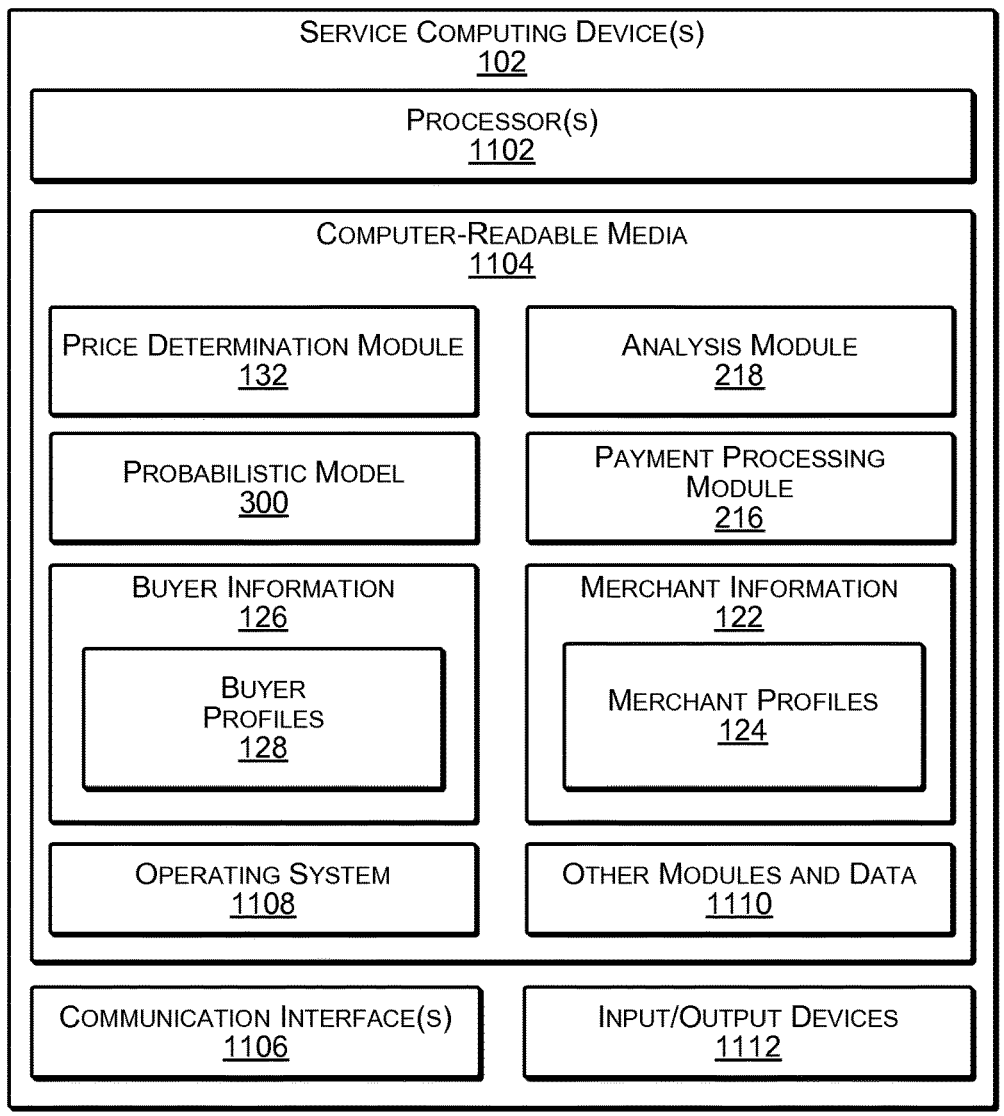
FIG. 11 illustrates select components of one or more example service computing devices according to some implementations.

FIG. 11 illustrates select components of the service computing device 102 that may be used to implement some functionality of the payment and pricing information service described herein. The service computing device 102 may be operated by a service provider that provides the payment service and the pricing information service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service computing device 102 may include one or more processors 1102, one or more computer-readable media 1104, and one or more communication interfaces 1106. Each processor 1102 may be a single processing unit or a number of processing units, and may include single or multiple computing units or multiple processing cores. The processor(s) 1102 can be implemented as one or more microprocessors, microcomputers, microcontrollers, digital signal processors, central processing units, state machines, logic circuitries, and/or any devices that manipulate signals based on operational instructions. For instance, the processor(s) 1102 may be one or more hardware processors and/or logic circuits of any suitable type specifically programmed or configured to execute the algorithms and processes described herein. The processor(s) 1102 can be configured to fetch and execute computer-readable instructions stored in the computer-readable media 1104, which can program the processor(s) 1102 to perform the functions described herein.

The computer-readable media 1104 may include volatile and nonvolatile memory and/or removable and non-removable media implemented in any type of technology for storage of information, such as computer-readable instructions, data structures, program modules, or other data. Such computer-readable media 1104 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 1104 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1104 may be used to store any number of functional components that are executable by the processors 1102. In many implementations, these functional components comprise instructions or programs that are executable by the processors 1102 and that, when executed, specifically configure the one or more processors 1102 to perform the actions attributed above to the service computing device 102. Functional components stored in the computer-readable media 1104 may include the price determination module 132, the analysis module 218, and the payment processing module 216. Additional functional components stored in the computer-readable media 1104 may include an operating system 1108 for controlling and managing various functions of the service computing device 102.

In addition, the computer-readable media 1104 may store data used for performing the operations described herein. Thus, the computer-readable media may store the merchant information 122, including the merchant profiles 124, and the buyer information 126, including the buyer profiles 128. In addition, at least a portion of the probabilistic model 300 may be stored on the computer-readable media and/or the service computing device 102 may access or generate the probabilistic model 300. The service computing device 102 may also include or maintain other functional components and data, such as other modules and data 1110, which may include programs, drivers, etc., and the data used or generated by the functional components. Further, the service computing device 102 may include many other logical, programmatic and physical components, of which those described above are merely examples that are related to the discussion herein.

The communication interface(s) 1106 may include one or more interfaces and hardware components for enabling communication with various other devices, such as over the network(s) 106. For example, communication interface(s) 1106 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device 102 may further be equipped with various input/output (I/O) devices 1112. Such I/O devices 1112 may include a display, various user interface controls (e.g., buttons, joystick, keyboard, mouse, touch screen, etc.), audio speakers, connection ports and so forth.

Figure 12:
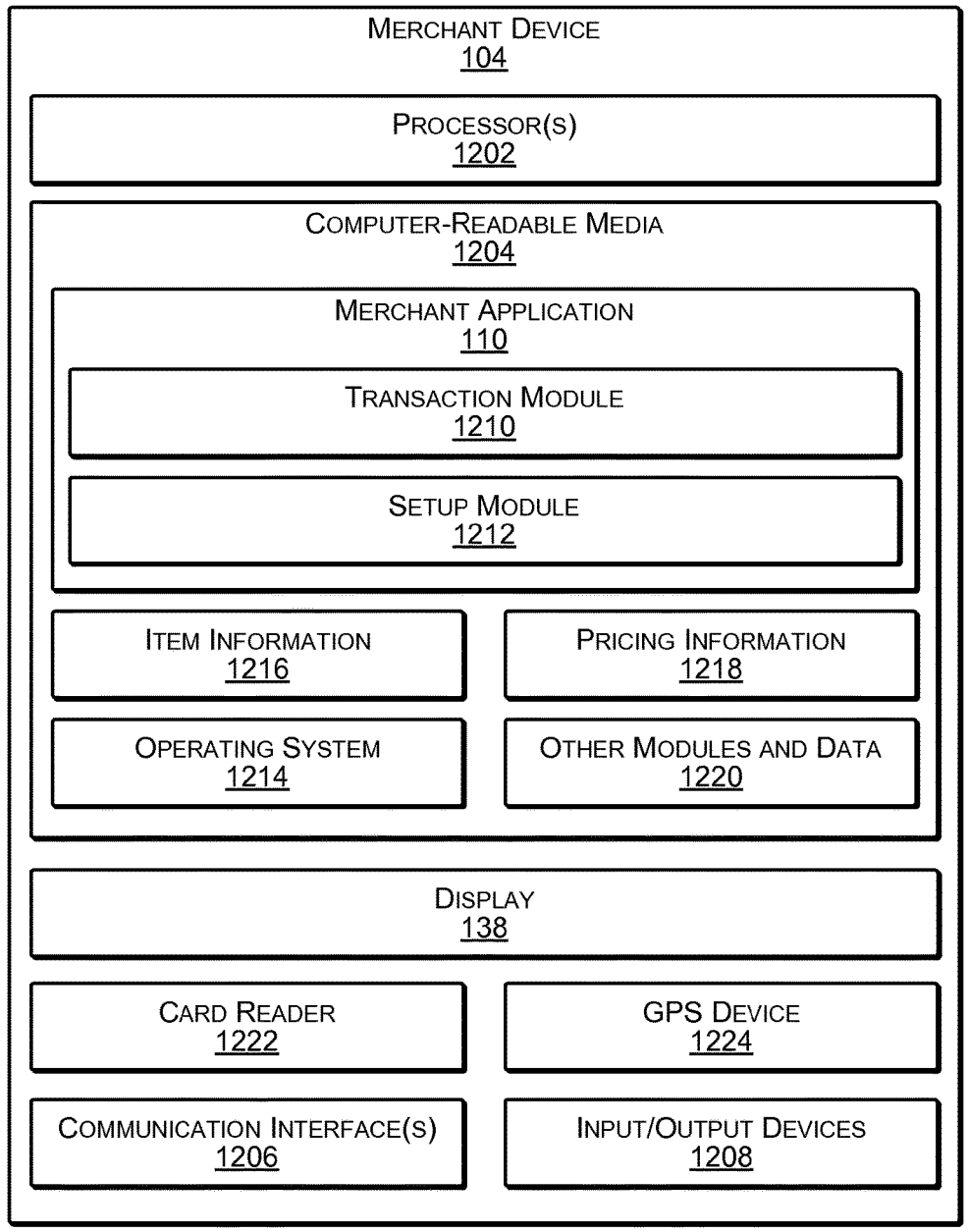
FIG. 12 illustrates select components of an example merchant device according to some implementations.

FIG. 12 illustrates select example components of an example merchant device 104 according to some implementations. The merchant device 104 may be any suitable type of computing device, e.g., portable, semi-portable, semi-stationary, or stationary. Some examples of the merchant device 104 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant device 104 includes at least one processor 1202, one or more computer-readable media 1204, one or more communication interfaces 1206, and one or more input/output (I/O) devices 1208. Each processor 1202 may itself comprise one or more processors or processing cores. For example, the processor 1202 can be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or configured to execute the algorithms and processes described herein. The processor 1202 can be configured to fetch and execute computer-readable processor-executable instructions stored in the computer-readable media 1204.

Depending on the configuration of the merchant device 104, the computer-readable media 1204 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1204 may include, but is not limited to, RAM, ROM, EEPROM, flash memory, solid-state storage, magnetic disk storage, optical storage, and/or other computer-readable media technology. Further, in some cases, the merchant device 104 may access external storage, such as RAID storage systems, storage arrays, network attached storage, storage area networks, cloud storage, or any other medium that can be used to store information and that can be accessed by the processor 1202 directly or through another computing device or network. Accordingly, the computer-readable media 1204 may be computer storage media able to store instructions, modules or components that may be executed by the processor 1202. Further, when mentioned, non-transitory computer-readable media exclude media such as energy, carrier signals, electromagnetic waves, and signals per se.

The computer-readable media 1204 may be used to store and maintain any number of functional components that are executable by the processor 1202. In some implementations, these functional components comprise instructions or programs that are executable by the processor 1202 and that, when executed, implement operational logic for performing the actions and services attributed above to the merchant device 104. Functional components of the merchant device 104 stored in the computer-readable media 1204 may include the merchant application 110. In this example, the merchant application 110 includes a transaction module 1210 and a setup module 1212. For example, the transaction module 1210 may present an interface, such as a payment interface, as discussed above, to enable the merchant to conduct transactions, receive payments, and so forth, as well as for communicating with the service computing device 102 for processing payments and sending transaction information. Further, the setup module 1212 may present a setup interface to enable the merchant to setup items, such as for adding new items or modifying information for existing items. The setup module 1212 may further enable the merchant to manage the merchant's account, the merchant profile, merchant preferences, view saved or new pricing information, and the like. Additional functional components may include an operating system 1214 for controlling and managing various functions of the merchant device 104 and for enabling basic user interactions with the merchant device 104.

In addition, the computer-readable media 1204 may also store data, data structures and the like, that are used by the functional components. For example, data stored by the computer-readable media 1204 may include item information 1216 that includes information about the items offered by the merchant, which may include a list of items currently available from the merchant, images of the items, descriptions of the items, prices of the items (e.g., the item price information 130—not shown in FIG. 12), and so forth. Furthermore, the computer readable media may have stored thereon pricing information 1218 that has been received from the service provider for one or more items and stored at least temporarily, or the like. Depending on the type of the merchant device 104, the computer-readable media 1204 may also optionally include other functional components and data, such as other modules and data 1220, which may include programs, drivers, etc., and the data used or generated by the functional components. Further, the merchant device 104 may include many other logical, programmatic and physical components, of which those described are merely examples that are related to the discussion herein.

The communication interface(s) 1206 may include one or more interfaces and hardware components for enabling communication with various other devices, such as over the network(s) 106 or directly. For example, communication interface(s) 1206 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 12 further illustrates that the merchant device 104 may include the display 138 mentioned above. Depending on the type of computing device used as the merchant device 104, the display 138 may employ any suitable display technology. For example, the display 138 may be a liquid crystal display, a plasma display, a light emitting diode display, an OLED (organic light-emitting diode) display, an electronic paper display, or any other suitable type of display able to present digital content thereon. In some examples, the display 138 may have a touch sensor associated with the display 138 to provide a touchscreen display configured to receive touch inputs for enabling interaction with a graphic interface presented on the display 138. Accordingly, implementations herein are not limited to any particular display technology. Alternatively, in some examples, the merchant device 104 may not include the display 138, and information may be presented by other means, such as aurally.

The merchant device 104 may further include the one or more I/O devices 1208. The I/O devices 1208 may include speakers, a microphone, a camera, and various user controls (e.g., buttons, a joystick, a keyboard, a keypad, etc.), a haptic output device, and so forth.

In addition, the merchant device 104 may include or may be connectable to a card reader 1222. In some examples, the card reader may plug in to a port in the merchant device, such as a microphone/headphone port, a data port, or other suitable port. The card reader may include a read head for reading a magnetic strip of a payment card, and further may include encryption technology for encrypting the information read from the magnetic strip. Alternatively, numerous other types of card readers may be employed with the merchant devices 104 herein, depending on the type and configuration of the merchant device 104.

Other components included in the merchant device 104 may include various types of sensors, which may include a GPS device 1224 able to indicate location information, as well as other sensors (not shown) such as an accelerometer, gyroscope, compass, proximity sensor, and the like. Additionally, the merchant device 104 may include various other components that are not shown, examples of which include removable storage, a power source, such as a battery and power control unit, and so forth.

Figure 13:
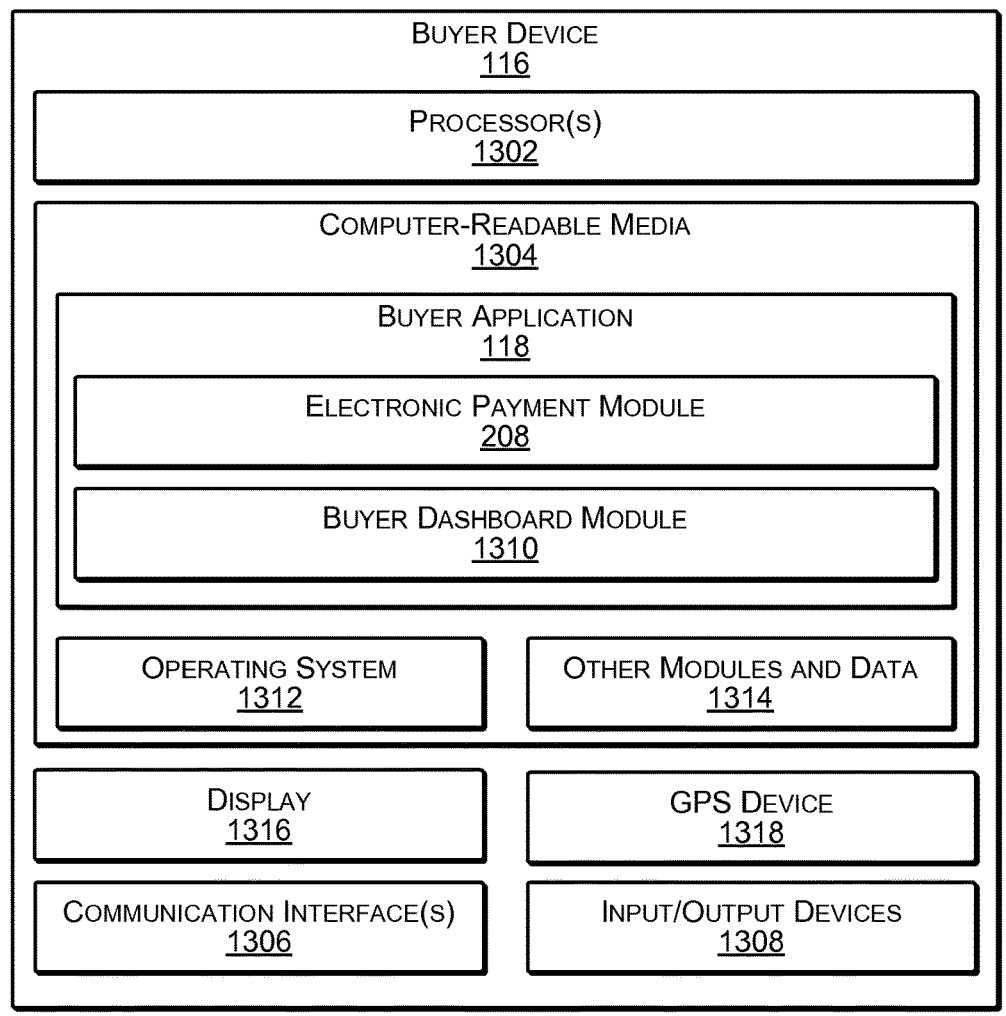
FIG. 13 illustrates select components of an example buyer device according to some implementations.

FIG. 13 illustrates select example components of the buyer device 116 that may implement the functionality described above according to some examples. The buyer device 116 may be any of a number of different types of portable computing devices. Some examples of the buyer device 116 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 13, the buyer device 116 includes components such as at least one processor 1302, one or more computer-readable media 1304, the one or more communication interfaces 1306, and one or more input/output (I/O) devices 1314. Each processor 1302 may itself comprise one or more processors or processing cores. For example, the processor 1302 can be implemented as one or more microprocessors, microcomputers, microcontrollers, digital signal processors, central processing units, state machines, logic circuitries, and/or any devices that manipulate signals based on operational instructions. In some cases, the processor 1302 may be one or more hardware processors and/or logic circuits of any suitable type specifically programmed or configured to execute the algorithms and processes described herein. The processor 1302 can be configured to fetch and execute computer-readable processor-executable instructions stored in the computer-readable media 1304.

Depending on the configuration of the buyer device 116, the computer-readable media 1304 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1304 may include, but is not limited to, RAM, ROM, EEPROM, flash memory, solid-state storage, magnetic disk storage, optical storage, and/or other computer-readable media technology. Further, in some cases, the buyer device 116 may access external storage, such as RAID storage systems, storage arrays, network attached storage, storage area networks, cloud storage, or any other medium that can be used to store information and that can be accessed by the processor 1302 directly or through another computing device or network. Accordingly, the computer-readable media 1304 may be computer storage media able to store instructions, modules or components that may be executed by the processor 1302. Further, when mentioned, non-transitory computer-readable media exclude media such as energy, carrier signals, electromagnetic waves, and signals per se.

The computer-readable media 1304 may be used to store and maintain any number of functional components that are executable by the processor 1302. In some implementations, these functional components comprise instructions or programs that are executable by the processor 1302 and that, when executed, implement operational logic for performing the actions and services attributed above to the buyer device 116. Functional components of the buyer device 116 stored in the computer-readable media 1304 may include the buyer application 118, as discussed above. In this example, the buyer application 118 includes the electronic payment module 208, as discussed above, and a buyer dashboard module 1310. For example, the buyer dashboard module 1310 may present the buyer with an interface for managing the buyer's account, changing information, changing preferences, and so forth. Additional functional components may include an operating system 1312 for controlling and managing various functions of the buyer device 116 and for enabling basic user interactions with the buyer device 116.

In addition, the computer-readable media 1304 may also store data, data structures and the like, that are used by the functional components. Depending on the type of the buyer device 116, the computer-readable media 1304 may also optionally include other functional components and data, such as other modules and data 1306, which may include applications, programs, drivers, etc., and the data used or generated by the functional components. Further, the buyer device 116 may include many other logical, programmatic and physical components, of which those described are merely examples that are related to the discussion herein.

The communication interface(s) 1306 may include one or more interfaces and hardware components for enabling communication with various other devices, such as over the network(s) 106 or directly. For example, communication interface(s) 1306 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 13 further illustrates that the buyer device 116 may include a display 1316. Depending on the type of computing device used as the buyer device 116, the display may employ any suitable display technology. For example, the display 1316 may be a liquid crystal display, a plasma display, a light emitting diode display, an OLED (organic light-emitting diode) display, an electronic paper display, or any other suitable type of display able to present digital content thereon. In some examples, the display 1316 may have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the buyer device 116 may not include a display.

The buyer device 116 may further include the one or more I/O devices 1308. The I/O devices 1308 may include speakers, a microphone, a camera, and various user controls (e.g., buttons, a joystick, a keyboard, a keypad, etc.), a haptic output device, and so forth.

Other components included in the buyer device 116 may include various types of sensors, which may include a GPS device 1318 able to indicate location information, as well as other sensors (not shown) such as an accelerometer, gyroscope, compass, proximity sensor, and the like. Additionally, the buyer device 116 may include various other components that are not shown, examples of which include removable storage, a power source, such as a battery and power control unit, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system implementing a payment service for communicating over one or more networks with a plurality of point of sale (POS) devices associated with a plurality of merchants, the system comprising:
one or more processors; and
one or more computer-readable media storing instructions executable by the one or more processors, wherein the instructions program the one or more processors to:
receive, from the plurality of POS devices executing respective instances of a merchant application, POS transaction information for a plurality of POS transactions occurring at a plurality of POS transaction locations;
associate the POS transaction information with individual merchant profiles corresponding to respective POS devices from which the POS transaction information was received;
associate the individual merchant profiles with at least one merchant category of a plurality of merchant categories, wherein the plurality of merchant categories are based at least in part on items offered via the respective POS devices;
associate the individual merchant profiles with one or more location categories based at least in part on the POS transaction locations associated with the respective POS devices, wherein the one or more location categories include a type of venue in which a POS transaction occurs;
securely store the individual merchant profiles in a database associated with the payment service;
receive, from a particular POS device associated with a particular merchant profile, information related to a particular item;
determine a merchant category associated with the particular merchant profile;
determine, based at least in part on a location of the particular POS device, at least one location category associated with the particular merchant profile;
determine a subset of the merchant profiles, wherein the merchant profiles in the subset are associated with at least one of a same merchant category or a same location category as the particular merchant profile;
determine pricing information for the particular item from the POS transaction information associated with the subset of the merchant profiles, wherein the pricing information includes a recommended price for the particular item;
send the pricing information to the particular POS device;
receive, from the particular POS device, an indication of a selection at the particular POS device of the recommended price;
receive, from the particular POS device, an indication of a transaction with a customer at the particular POS device, wherein the transaction comprises at least a sale of the particular item; and
process a payment for the transaction, wherein the payment includes funds associated with the particular item and corresponding to the recommended price.

2. The system as recited in claim 1, wherein the instructions further program the one or more processors to:
associate individual POS transactions from the POS transaction information with a plurality of respective buyer profiles, wherein individual buyer profiles include respective buyer information and information regarding at least one POS transaction associated with the respective buyer information; and
determine a subset of the buyer profiles that each include information regarding one or more POS transactions associated with at least one of the particular merchant profile or the subset of merchant profiles for acquiring the particular item;
wherein the determining the pricing information is based at least in part on prices paid for the particular item as indicated in the information regarding the one or more POS transactions included in the subset of buyer profiles.

3. The system as recited in claim 1, wherein the instructions further program the one or more processors to determine the recommended price based on one or more factors comprising at least one of:
a cost of the particular item associated with the particular merchant profile;
a specified profit margin associated with the particular merchant profile;
at least one specified buyer characteristic associated with the particular merchant profile; or
an expressed or implied business model associated with the particular merchant profile.

4. The system as recited in claim 1, wherein:
the pricing information indicates prices of items previously selected through respective POS devices associated with the individual merchant profiles; and
the POS transaction information indicates, for individual POS transactions of a plurality of POS transactions, at least one item acquired during each POS transaction and a price paid for acquiring the at least one item.

5. A method comprising:
receiving, by a service computing device associated with a payment service, from a plurality of point of sale (POS) devices associated with a plurality of respective merchant profiles and executing respective instances of a merchant application, POS transaction information, the payment service being configured to communicate with the plurality of POS devices;
receiving, from a POS device associated with a particular merchant profile, a request for information regarding pricing of a particular item;
determining, from the particular merchant profile, a location of the POS device;

determining a subset of the plurality of merchant profiles, wherein each of the merchant profiles in the subset of merchant profiles are associated with a location that is within a predetermined proximity to the location of the POS device;

associating the POS transaction information with a plurality of buyer profiles, wherein individual buyer profiles include buyer information and information regarding at least one POS transaction associated with the buyer information;

determining a subset of the buyer profiles that include information regarding one or more POS transactions for acquiring the particular item;

determining pricing information for the particular item, based at least in part on the POS transaction information associated with the subset of merchant profiles and on the information regarding one or more POS transactions for acquiring the particular item included in the subset of the buyer profiles; and sending the pricing information to the POS device associated with the particular merchant profile.

6. The method as recited in claim 5, further comprising:
associating the POS transaction information with respective merchant profiles corresponding to respective POS devices from which the POS transaction information was received,
wherein the merchant profiles in the subset of merchant profiles are similar to the particular merchant profile with respect to types of items offered.

7. The method as recited in claim 6, wherein the determining the subset of merchant profiles further comprises:
associating each of the plurality of merchant profiles and the particular merchant profile with at least one merchant category of a plurality of merchant categories, wherein the merchant categories are based at least in part on the items offered through the respective POS devices corresponding to the respective merchant profiles;
wherein determining the subset of the merchant profiles is based at least in part on the merchant profiles in the subset being associated with a same merchant category as the particular merchant profile.

8. The method as recited in claim 6, further comprising:
associating each of the plurality of merchant profiles and the particular merchant profile with at least one location category, wherein a location category indicates at least one of a geographic region, a portion of a geographic region, or a defined physical area; and
wherein the determining the subset of the merchant profiles is based at least in part on the merchant profiles in the subset being associated with a same location category as the particular merchant profile.

9. The method as recited in claim 5, wherein the determining the pricing information for the particular item further comprises determining at least one of:
a highest price at which the particular item is offered;
a lowest price at which the particular item is offered;
a median price at which the particular item is offered; or
an average price at which the particular item is offered.

10. The method as recited in claim 5, wherein:
determining the pricing information for the particular item further comprises determining a recommended price for the particular item based at least in part on information received from the POS device associated with the particular merchant profile; and determining the recommended price for the particular item further comprises determining the recommended price based at least in part on at least one of:
a cost of the particular item associated with the particular buyer profile; or
a specified profit margin associated with the particular buyer profile.

11. The method as recited in claim 5, further comprising determining the subset of buyer profiles based on at least one common characteristic, wherein the at least one common characteristic is determined based on at least one of: buyer residence information; buyer age; buyer sex; buyer affluence; buyer ethnicity; buyer language; buyer education; buyer marital status; buyer occupation; buyer religion; buyer political affiliation; or buyer association membership.

12. The method as recited in claim 5, further comprising associating the POS transaction information with the respective buyer profiles based at least in part on determining that buyer information included with the POS transaction information matches buyer information in the respective buyer profiles with a level of confidence that exceeds a threshold level of confidence.

13. A method comprising:
receiving, by a service computing device associated with a payment service and from a plurality of point of sale (POS) devices executing respective instances of a merchant application, POS transaction information for a plurality of POS transactions occurring at a plurality of POS transaction locations, the payment service being configured to communicate with the plurality of POS devices;

associating, by the service computing device, the POS transaction information with individual merchant profiles corresponding to respective POS devices from which the POS transaction information was received;

associating, by the service computing device, the individual merchant profiles with at least one merchant category of a plurality of merchant categories, wherein the merchant categories are based at least in part on the items offered through the respective POS devices corresponding to the individual merchant profiles;

associating, by the service computing device, the individual merchant profiles with one or more location categories based at least in part on the POS transaction locations associated with the respective POS devices, wherein the one or more location categories include a type of venue in which a POS transaction occurs;

receiving, from a particular POS device associated with a particular merchant profile, information related to a particular item;

determining, by the service computing device, a merchant category associated with the particular merchant profile;

determining, based at least in part on a location of the particular POS device, at least one location category associated with the particular merchant profile;

determining a subset of the merchant profiles, wherein the merchant profiles in the subset are associated with at least one of a same merchant category or a same location category as the particular merchant profile;

determining pricing information for the particular item from the POS transaction information associated with the subset of the merchant profiles, wherein the pricing information includes a recommended price for the particular item;

sending the pricing information to the particular POS device;

receiving, from the particular POS device, an indication of a selection at the particular POS device of the recommended price;

receiving, from the particular POS device, an indication of a particular POS transaction with a customer at the particular POS device, wherein the particular POS transaction comprises at least a sale of the particular item; and processing a payment for the transaction, wherein the payment includes funds associated with the particular item and corresponding to the recommended price.

14. The method as recited in claim 13, further comprising:

associating individual POS transactions from the POS transaction information with a plurality of respective buyer profiles, wherein individual buyer profiles include respective buyer information and information regarding at least one POS transaction associated with the respective buyer information; and determining a subset of the buyer profiles that each include information regarding one or more POS transactions associated with at least one of the particular merchant profile or the subset of merchant profiles for acquiring the particular item;

wherein the determining the pricing information is based at least in part on prices paid for the particular item as indicated in the information regarding the one or more POS transactions included in the subset of buyer profiles.

15. The method as recited in claim 13, further comprising:

determining the recommended price based on one or more factors comprising at least one of:
 a cost of the particular item associated with the particular merchant profile;
 a specified profit margin associated with the particular merchant profile;
 at least one specified buyer characteristic associated with the particular merchant profile; or
 an expressed or implied business model associated with the particular merchant profile.

16. The method as recited in claim 13, wherein:

the pricing information indicates prices of items previously selected through respective POS devices associated with the individual merchant profiles; and the POS transaction information indicates, for individual POS transactions of a plurality of POS transactions, at least one item acquired during each POS transaction and a price paid for acquiring the at least one item.

17. One or more non-transitory computer-readable media maintaining instructions that, when executed by one or more processors of a service computing device associated with a payment service that is configured to communicate with a plurality of point of sale (POS) devices, program the one or more processors to perform operations comprising:

receiving from the plurality of POS devices associated with a plurality of respective merchant profiles and executing respective instances of a merchant application, POS transaction information;

receiving, from a POS device associated with a particular merchant profile, a request for information regarding pricing of a particular item;

determining, from the particular merchant profile, a location of the POS device;

determining a subset of the plurality of merchant profiles, wherein each of the merchant profiles in the subset of merchant profiles are associated with a location that is within a predetermined proximity to the location of the POS device, wherein determining the subset of the plurality of merchant profiles comprises:
 associating each of the plurality of merchant profiles and the particular merchant profile with at least one merchant category of a plurality of merchant categories, wherein the merchant categories are based at least in part on the items offered through the respective POS devices corresponding to the respective merchant profiles; and
 determining the subset of the merchant profiles based at least in part on the merchant profiles in the subset being associated with a same merchant category as the particular merchant profile;

determining pricing information for the particular item, at least in part, from the POS transaction information associated with the subset of merchant profiles;

sending the pricing information to the POS device associated with the particular merchant profile;

associating the at least one of the pricing information or the POS transaction information with respective merchant profiles corresponding to respective POS devices from which the at least one of the pricing information or the POS transaction information was received; and wherein the merchant profiles in the subset are similar to the particular merchant profile with respect to types of items offered.

18. The one or more non-transitory computer-readable media as recited in claim 17, wherein the operations further comprise:

associating each of the plurality of merchant profiles and the particular merchant profile with at least one location category, wherein a location category indicates at least one of a geographic region, a portion of a geographic region, or a defined physical area;

wherein determining the subset of the merchant profiles includes determining the subset of merchant profiles based at least in part on the merchant profiles in the subset being associated with a same location category as the particular merchant profile.

19. The one or more non-transitory computer-readable media as recited in claim 17, wherein the determining the pricing information for the particular item comprises determining at least one of:
 a highest price at which the particular item is offered;
 a lowest price at which the particular item is offered;
 a median price at which the particular item is offered; or
 an average price at which the particular item is offered.

20. The one or more non-transitory computer-readable media as recited in claim 17, wherein:

determining the pricing information for the particular item comprises determining a recommended price for the particular item based at least in part on information received from the POS device associated with the particular merchant profile; and determining the recommended price for the particular item comprises determining the recommended price based at least in part on at least one of:
 a cost of the particular item associated with a particular buyer profile;
 or
 a specified profit margin associated with the particular buyer profile.

21. The one or more non-transitory computer-readable media as recited in claim 17, wherein the operations further comprise:

associating the POS transaction information with a plurality of respective buyer profiles, wherein individual buyer profiles include respective buyer information and information regarding at least one POS transaction associated with the respective buyer information; and
determining a subset of the buyer profiles that include information regarding one or more POS transactions for acquiring the particular item;
wherein determining the pricing information is based, at least in part, on the information regarding one or more POS transactions for acquiring the particular item included in the subset of the buyer profiles.

22. The one or more non-transitory computer-readable media as recited in claim 21, wherein determining the subset of buyer profiles includes determining the subset of buyer profiles based on at least one common characteristic, wherein the at least one common characteristic is determined based on at least one of: buyer residence information; buyer age; buyer sex; buyer affluence; buyer ethnicity; buyer language; buyer education; buyer marital status; buyer occupation; buyer religion; buyer political affiliation; or buyer association membership.

23. The one or more non-transitory computer-readable media as recited in claim 21, wherein associating the POS transaction information includes associating the POS transaction information with the respective buyer profiles based at least in part on determining that buyer information included with the POS transaction information matches buyer information in the respective buyer profiles with a level of confidence that exceeds a threshold level of confidence.

24. The system as recited in claim 1, wherein the type of venue in which a POS transaction occurs is at least one of:
    a transportation hub;
    a shopping area;
    a sports venue; or
    an outdoor event.

25. The method as recited in claim 13, wherein the type of venue in which a POS transaction occurs is at least one of:
    a transportation hub;
    a shopping area;
    a sports venue; or
    an outdoor event.

26. The method as recited in claim 5, further comprising:
    receiving, from the POS device, an indication of a transaction with a customer at the POS device, wherein the transaction comprises at least a sale of the particular item; and
    processing a payment for the transaction, wherein the payment includes funds associated with the particular item and corresponding to the pricing information.

27. The one or more non-transitory computer-readable media as recited in claim 17, the operations further comprising:
    receiving, from the POS device, an indication of a transaction with a customer at the POS device, wherein the transaction comprises at least a sale of the particular item; and
    processing a payment for the transaction, wherein the payment includes funds associated with the particular item and corresponding to the pricing information.

28. The method as recited in claim 13, wherein the determining the pricing information for the particular item further comprises determining at least one of:
    a highest price at which the particular item is offered;
    a lowest price at which the particular item is offered;
    a median price at which the particular item is offered; or
    an average price at which the particular item is offered.

* * * * *